(12) United States Patent
Ichihashi et al.

(10) Patent No.: US 7,505,101 B2
(45) Date of Patent: Mar. 17, 2009

(54) LIQUID CRYSTAL DISPLAY

(75) Inventors: Mitsuyoshi Ichihashi, Minami-ashigara (JP); Hajime Nakayama, Minami-ashigara (JP)

(73) Assignee: Fujifilm Corporation, Minato-Ku, tokyo (JP)

( * ) Notice: Subject to any disclaimer, the term of this patent is extended or adjusted under 35 U.S.C. 154(b) by 131 days.

(21) Appl. No.: 11/793,056

(22) PCT Filed: Dec. 22, 2005

(86) PCT No.: PCT/JP2005/024167

§ 371 (c)(1),
(2), (4) Date: Jun. 15, 2007

(87) PCT Pub. No.: WO2006/068311

PCT Pub. Date: Jun. 29, 2006

(65) Prior Publication Data

US 2008/0198316 A1    Aug. 21, 2008

(30) Foreign Application Priority Data

Dec. 22, 2004   (JP)   ............................. 2004-372111

(51) Int. Cl.
*G02F 1/13363* (2006.01)
*G02F 1/1335* (2006.01)

(52) U.S. Cl. .................. 349/118; 349/18; 349/117
(58) Field of Classification Search ............ 385/18, 385/117, 118
See application file for complete search history.

(56) References Cited

U.S. PATENT DOCUMENTS

2006/0215079 A1* 9/2006 Suzuki et al. ............... 349/96

(Continued)

FOREIGN PATENT DOCUMENTS

JP   2004-054257 A   2/2004

(Continued)

OTHER PUBLICATIONS

International Search Report for PCT/JP2005/024167, dated Apr. 11, 2006.

(Continued)

*Primary Examiner*—Michelle R Connelly Cushwa
(74) *Attorney, Agent, or Firm*—Buchanan Ingersoll & Rooney PC

(57) ABSTRACT

A liquid crystal display comprising a first polarization film, a first retardation region, a second retardation region, a liquid crystal layer, a liquid crystal cell, and a second polarization film disposed in this order, liquid crystal molecules of the liquid crystal layer being aligned in parallel with surfaces of the substrates at the time of dark state, wherein Re of the first retardation region is 70 nm to 330 nm, Nz value of the first retardation region is greater than 0 and less than 0.4, Re of the second retardation region is equal to 50 nm or less and an optical axis is simultaneously not included in the in-plane of the second retardation region, Rth of the second retardation region is 10 nm to 140 nm, a slow axis of the first retardation region is orthogonal to a transmissive axis of the first polarization film that is simultaneously in parallel with a slow axis direction of the liquid crystal molecules at the time of dark state, each of the first and second polarization films has at least a protective film on a plane close to the liquid crystal layer, and the corresponding protective film is a cellulose acylate film which meets the formulae (I) and (II) below.

$$0 \leq Re_{(630)} \leq 10, \text{ and, } |Rth_{(630)}| \leq 25 \qquad (I)$$

$$|Re_{(400)} - Re_{(700)}| \leq 10, \text{ and, } |Rth_{(400)} - Rth_{(700)}| \leq 35 \qquad (II).$$

16 Claims, 3 Drawing Sheets

U.S. PATENT DOCUMENTS

| | | | |
|---|---|---|---|
| 2008/0024703 A1* | 1/2008 | Ichihashi | 349/119 |
| 2008/0218672 A1* | 9/2008 | Ichihashi et al. | 349/118 |
| 2008/0254237 A1* | 10/2008 | Omatsu et al. | 428/1.31 |
| 2008/0273146 A1* | 11/2008 | Ohtani et al. | 349/96 |
| 2008/0309860 A1* | 12/2008 | Nimura et al. | 349/117 |

FOREIGN PATENT DOCUMENTS

| | | |
|---|---|---|
| JP | 2004-226591 A | 8/2004 |
| JP | 2004-258602 A | 9/2004 |

OTHER PUBLICATIONS

International Preliminary Report on Patentability and Written Opinion issued in corresponding International Patent Application No. PCT/JP2005/024167; Jul. 5, 2007; The International Bureau of WIPO, Geneva, CH.

* cited by examiner

LIQUID CRYSTAL DISPLAY

TECHNICAL FIELD

The present invention relates to a liquid crystal display (LCD) using a cellulose acylate film useful for the LCD, and more particularly, to a ferroelectric LCD, an antiferroelectric LCD, and an in-lane switching mode LCD for performing display by applying a traverse electric field to a nematic liquid crystal aligned in a horizontal direction.

BACKGROUND ART

In the LCD, a so-called twisted nematic (TN) mode is widely used, which applies an electric field in a vertical direction with respect to a substrate having a liquid crystal layer. In this case, nematic liquid crystals are twisted and arranged between two polarization plates orthogonal to each other. According to this mode, the liquid crystals rise with respect to the substrate at the time of dark state, so that a birefringence occurs due to the liquid crystal molecules when seen in an aslant direction, which thus causes an optical leakage. To cope with this problem, a technique of optically compensating the liquid crystal cell using a film in which liquid crystalline molecules are hybrid-aligned, has been put into practice. However, it is very difficult to completely and optically compensate for the liquid crystal cell even when the liquid crystalline molecules are used, so that a gray inversion cannot be completely suppressed in a lower screen.

To deal with the problem, an LCD, using a so-called in-plane switching (IPS) mode of applying a traverse electric field to the liquid crystal or a vertically aligned (VA) mode of aligning liquid crystals with a negative dielectric anisotropy by means of protrusions or slit electrodes formed within panels, has been suggested and put into practice. Recently, these panels are used not only for a monitor but a TV, so that a luminance of the screen significantly increases. Accordingly, a few optical leakages in an inclined incident direction of an opposing angular location at the time of dark state, which was problematic in the conventional operation modes, have been recognized as a cause of degrading the display quality.

As one means for improving such hue or a viewing angle of the dark state, it is studied even in the IPS mode to dispose an optical compensation material having a birefringence property between a liquid crystal layer and a polarization plate. For example, a method of disposing birefringence medium of which optical axes having a function of compensating the increase and decrease of the retardation of the liquid crystal layer at the time of inclination between the substrate and the polarization plate to improve the color when the white color or the halftone display is directly viewed in the inclined direction (see JP-A-9-80424). In addition, methods of using an optical compensation film formed of a discotic liquid crystalline compound or a styrene polymer having a negative intrinsic birefringence (see JP-A-10-54982, JP-A-11-202323, and JP-A-9-292522), a method of combining a film of which a birefringence is positive and an optical axis lies in the in-plane of the film and a film of which a birefringence is positive and an optical axis lies in a direction normal to the film (see JP-A-11-133408), a method of using a biaxial optical compensation sheet having the retardation of one half wavelength (see JP-A-11-305217), and a method of preparing an optical compensation layer having a positive retardation on a surface of the film having a negative retardation as a protective film of the polarization plate are proposed (see JP-A-10-307291).

However, most of the proposed methods remove the birefringence anisotropy of the liquid crystal of the liquid crystal cell to improve the viewing angle, so that optical leakages due to deviation from the orthogonal angle between the polarization axes crossing each other when the orthogonal polarization plates are seen in the inclined direction cannot be sufficiently suppressed.

In addition, even when such optical leakages may be compensated, it is very difficult to completely and optically compensate for the liquid crystal cell without any problems. The major cause lies in the optical anisotropy of the protective film of the polarization plate, and in order to carry out the optical compensation including the same, the anisotropy of the retardation film should extremely increase, or an additional optical anisotropical layer should be given.

A method of decreasing the phase difference value of the protective film has been tried, which uses a film containing a norbornene resin or a resin having an imide group and a resin having a phenyl group and a nitrile group for the protective film (see JP-A-2004-4641 and JP-A-2004-4642). However, these synthesized resins are generally hydrophobic and are apt to be stripped due to a problem in adhesion with the polarization film. In addition, it cannot be expected that water vapors be transmitted from the polarization film in a process of stacking the protective film on both of the polarization films, so that the moistures remain inside to cause the degradation of the polarization performance.

An object of the present invention is to provide an IPS type LCD which has a simplified structure and a significantly improved viewing angle as well as display quality.

DISCLOSURE OF THE INVENTION

The object has been accomplished by the liquid crystal display device as defined under the following items (1) to (16).

(1) A liquid crystal display comprising at least a first polarization film, a first retardation region, a second retardation region, a liquid crystal layer, a liquid crystal cell composed of a pair of substrates with the liquid crystal layer being interposed between the substrates, and a second polarization film disposed in this order, liquid crystal molecules of the liquid crystal layer being aligned in parallel with surfaces of the substrates at the time of dark state, wherein an in-plane retardation (Re) of the first retardation region is 70 nm to 330 nm, an Nz value of the first retardation region defined as Nz=Rth/Re+0.5 using the in-plane retardation (Re) and retardation (Rth) of a thickness direction of the first retardation region is greater than 0 and less than 0.4, an in-plane retardation of the second retardation region is equal to 50 nm or less and an optical axis is simultaneously not included in the in-plane of the second retardation region, a retardation of a thickness direction of the second retardation region is 10 nm to 140 nm, a slow axis of the first retardation region is orthogonal to a transmissive axis of the first polarization film and the transmissive axis of the first polarization film is simultaneously in parallel with a slow axis direction of the liquid crystal molecules at the time of dark state, each of the first and second polarization films has at least a protective film on a plane close to the liquid crystal layer, in which the corresponding protective film may act as another layer, and the corresponding protective film is a cellulose acylate film which meets the formulae (I) and (II) below:

$$0 \leq Re_{(630)} \leq 10, \text{ and, } |Rth_{(630)}| \leq 25 \qquad (I)$$

$$|Re_{(400)} - Re_{(700)}| \leq 10, \text{ and, } |Rth_{(400)} - Rth_{(700)}| \leq 35 \qquad (II)$$

wherein $Re_{(\lambda)}$ represents an in-plane retardation (nm) in the wavelength λ nm, and $Rth_{(\lambda)}$ represents a retardation (nm) of a film thickness direction in the wavelength λ nm.

(2) A liquid crystal display comprising at least a first polarization film, a second retardation region, a first retardation region, a liquid crystal layer, a liquid crystal cell composed of a pair of substrates with the liquid crystal layer being interposed between the substrates, and a second polarization film disposed in this order, liquid crystal molecules of the liquid crystal layer being aligned in parallel with surfaces of the substrates at the time of dark state, wherein an in-plane retardation (Re) of the first retardation region is 80 nm to 230 nm, an Nz value of the first retardation region defined as Nz=Rth/Re+0.5 using the in-plane retardation (Re) and retardation (Rth) of a thickness direction of the first retardation region is greater than 0 and less than 0.4, an in-plane retardation of the second retardation region is equal to 50 nm or less and an optical axis is simultaneously not included in the in-plane of the second retardation region, a retardation of a thickness direction of the second retardation region is 20 nm to 120 nm, a slow axis of the first retardation region is in parallel with a transmissive axis of the first polarization film and the transmissive axis of the first polarization film is simultaneously in parallel with a slow axis direction of the liquid crystal molecules at the time of dark state, each of the first and second polarization films has at least a protective film on a plane close to the liquid crystal layer, in which the corresponding protective film may act as another layer, and the corresponding protective film is a cellulose acylate film which meets the formulae (I) and (II) below:

$$0 \leq Re_{(630)} \leq 10, \text{ and, } |Rth_{(630)}| \leq 25 \quad (I)$$

$$|Re_{(400)} - Re_{(700)}| \leq 10, \text{ and, } |Rth_{(400)} - Rth_{(700)}| \leq 35 \quad (II)$$

wherein $Re_{(\lambda)}$ represents an in-plane retardation (nm) in the wavelength λ nm, and $Rth_{(\lambda)}$ represents a retardation (nm) of a film thickness direction in the wavelength λ nm.

(3) The liquid crystal display according to (1) or (2), wherein the cellulose acylate film includes at least one kind of compounds decreasing the Rth of the corresponding cellulose acylate film in a range meeting the formulae denoted below:

$$(Rth_{(A)} - Rth_{(0)})/A \leq -1.0 \quad (III)$$

$$0.01 \leq A \leq 30 \quad (IV)$$

wherein $Rth_{(A)}$ represents the Rth (nm) of the cellulose acylate film containing the compound decreasing the Rth by A %, $Rth_{(0)}$ represents the Rth (nm) of the cellulose acylate film not containing the compound decreasing the Rth(λ), and A represents % by weight of the compound decreasing the Rth(λ) with respect to a material polymer of the cellulose acylate film.

(4) The liquid crystal display according to any one of (1) to (3), wherein the cellulose acylate film includes at least one kind of compounds decreasing the Rth by 0.01 to 30% by weight respect to a solid content of the cellulose acylate having an acyl substitution degree of 2.85 to 3.00.

(5) The liquid crystal display according to any one of (1) to (4), wherein the cellulose acylate film includes at least one kind of compounds decreasing $|Rth_{(400)} - Rth_{(700)}|$ of the cellulose acylate film by 0.01 to 30% by weight respect to a solid content of the corresponding cellulose acylate.

(6) The liquid crystal display according to any one of (1) to (5), wherein a thickness of the cellulose acylate film is 10 to 120 μm.

(7) The liquid crystal display according to any one of (1) to (6), wherein the cellulose acylate film includes at least one kind of compounds decreasing the Rth and simultaneously having an octanol-water partition coefficient (Log P value) of 0 to 7 by 0.01 to 30% by weight with respect to a solid content of the corresponding cellulose acylate.

(8) The liquid crystal display according to (7), wherein the compound decreasing the Rth and simultaneously having the octanol-water partition coefficient (Log P value) of 0 to 7 is a compound denoted in the following formula (13) and/or (18):

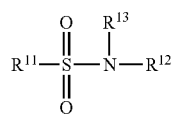

Formula (13)

wherein $R^{11}$ represents an alkyl group or aryl group, each of $R^{12}$ and $R^{13}$ independently represents a hydrogen atom, an alkyl group, or an aryl group,

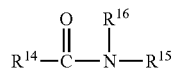

Formula (18)

wherein $R^{14}$ represents an alkyl group or aryl group, each of $R^{15}$ and $R^{16}$ each independently represent a hydrogen atom, an alkyl group, or an aryl group.

(9) The liquid crystal display according to any one of (1) to (8), wherein the cellulose acylate film has a spectral transmissivity of 45 to 95% in the wavelength of 380 nm, and a spectral transmissivity of 10% or less in the wavelength of 350 nm.

(10) The liquid crystal display according to any one of (1) to (9), wherein a variation of the Rth of the cellulose acylate film after processed in RH of 90% at 60° C. for 240 hours is 15 nm or less.

(11) The liquid crystal display according to any one of (1) to (10), wherein a variation of the Rth of the cellulose acylate film after processed at 80° C. for 240 hours is 15 nm or less.

(12) The liquid crystal display according to any one of (1) to (11), wherein an in-plane front retardation of the cellulose acylate film meets the formula denoted below:

$$|Re_{(n)} - Re_{(0)}|/n \leq 1.0$$

wherein $Re_{(n)}$ represents the in-plane front retardation (nm) of the film stretched by n(%), and $Re_{(0)}$ represents the in-plane front retardation (nm) of the film not stretched.

(13) The liquid crystal display according to any one of (1) to (12), wherein the cellulose acylate film has the slow axis in a direction (TD direction) vertical to a carried direction (MD direction) of the corresponding film of a machine manufacturing the film within the corresponding film in-plane.

(14) The liquid crystal display according to any one of (1) to (13), wherein a front retardation decreases when the cellulose acylate film is stretched in the direction having the slow axis in the corresponding film in-plane, and increases when the cellulose acylate film is stretched in the direction vertical to the direction having the slow axis in the corresponding film in-plane.

(15) The liquid crystal display according to any one of (1) to (14), wherein the first and second retardation regions are disposed in a location closer to the substrate opposite to a visible side in the pair of substrates of the liquid crystal cell.

(16) The liquid crystal display according to any one of (1) to (14), wherein the first and second retardation regions are disposed in a location closer to the substrate at a visible side in the pair of substrates of the liquid crystal cell.

Figure 1:
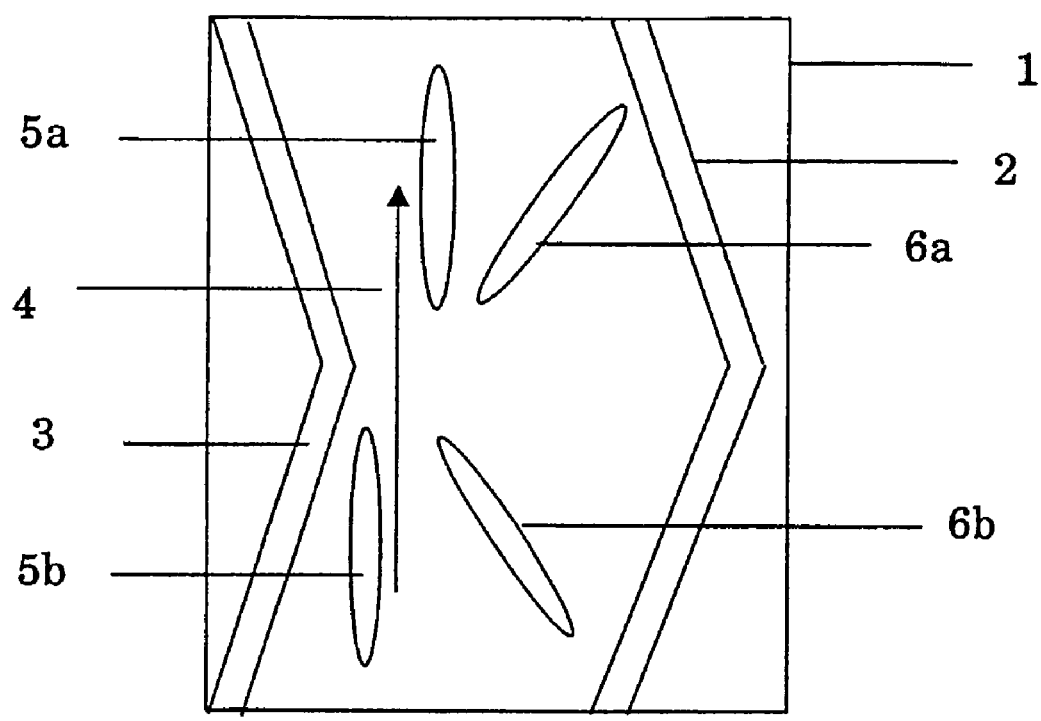
FIG. 1 is a schematic view illustrating an example of a pixel region of the LCD of the present invention.
Figure 2:
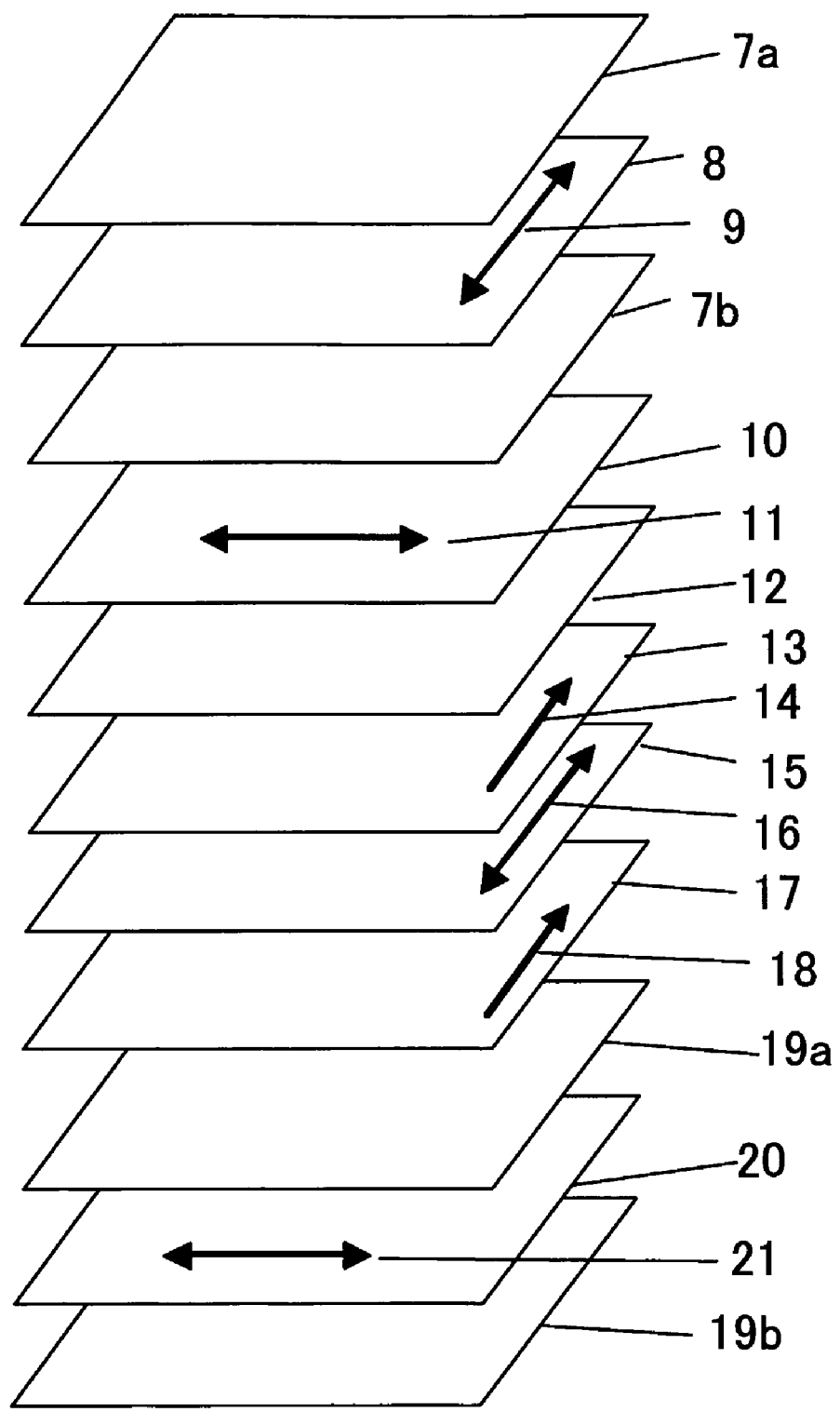
FIG. 2 is a schematic view illustrating an example of the LCD of the present invention.
Figure 3:
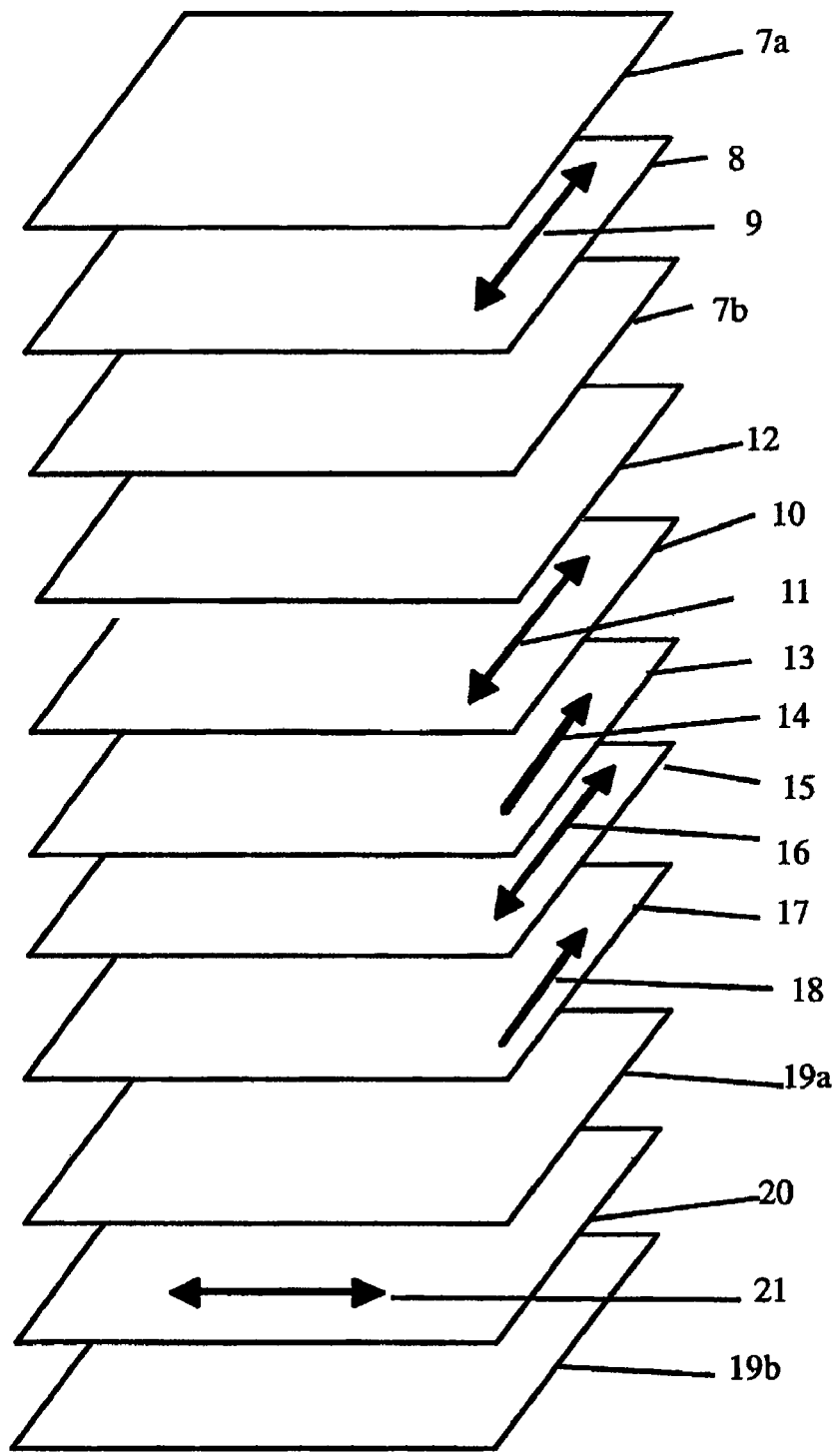
FIG. 3 is a schematic view illustrating another example of the LCD of the present invention.

In the FIGS. 1 to 3, 1 denotes pixel region of liquid crystal element, 2 denotes pixel electrode, 3 denotes display electrode, 4 denotes rubbing direction, 5a and 5b denote director of liquid crystal compound at the time of dark state, 6a and 6b denote director of liquid crystal compound at the time of white display, 7a, 7b, 19a and 19b denote protective layer for polarization film, 8 and 20 denote polarization film, 9 and 21 denote polarization transmissive axis of polarization film, 10 denotes first retardation region, 11 denotes slow axis of first retardation region, 12 denotes second retardation region, 13 and 17 denote cell substrate, 14 and 18 denote rubbing direction of cell substrate, 15 denotes liquid crystal layer, and 16 denotes slow axis direction of liquid crystal layer.

BEST MODE FOR CARRYING OUT THE INVENTION

Hereinafter, an embodiment of the LCD of the present invention and its constitutional members will be sequentially described. In addition, the numerical range using the symbol 'to' herein means the range including the values denoted after and before the symbol 'to' as a lower limit value and an upper limit value.

In the present invention, Re and Rth denote the in-plane retardation and the retardation of the thickness direction in the wavelength of 550 nm, respectively. Re is measured by the KOBRA 21ADH (available by Oji Scientific Instruments) making lights having the wavelength of 550 nm incident in a direction normal to the film. Rth is measured by the KOBRA 21ADH based on the retardations measured in the total three directions such as the Re, the retardation measured making lights having the wavelength of 550 nm incident from the direction inclined by +40° with respect to the direction normal to the film using the in-plane slow axis as an inclined axis (rotational axis determined by the KOBRA 21ADH), and the retardation measured making lights having the wavelength of 550 nm incident from the direction inclined by −40° with respect to the direction normal to the film using the in-plane slow axis as an inclined axis (rotational axis).

In this case, the assumed values of the average refractive index may be used from catalogue values of various optical films of the polymer handbook (JOHN WILEY&SONS, INC.). Values of the average refractive index which are not well known may be measured by the Abbe refractometer. Values of the average refractive index of principle optical films are denoted below: cellulose acylate (1.48), cycloolefin-polymer (1.52), polycarbonate (1.59), polymethylmethacrylate (1.49), and polystyrene (1.59). The assumed values and film thickness of these average refractive indices are input to calculate nx, ny, and nz by the KOREA 21ADH.

In addition, the polarity of Rth is positive when the retardation measured making lights having a wavelength of 550 nm incident from the inclined direction by +20° with respect to the direction normal to the film using the in-plane slow axis as an inclination axis (rotational axis) exceeds Re, and is negative when it falls below Re. However, in a case of the test sample having |Rth/Re| of 9 or more, it is positive when the slow axis of the sample capable of being determined using the test plate of the polarization plate is in parallel with the film plane in the inclined state by +40° with respect to the direction normal to the film based on the in-plane fast axis as an inclined axis (rotational axis) by means of a polarization microscope having a free rotational base, and is negative when the slow axis lies in the thickness direction of the film.

In the present invention, the terms "parallel" and "orthogonal" mean the range within the accurate angle less than ±10'. In this range, an error with the accurate angle is preferably less than ±5°, and more preferably, ±2°. In addition, the slow axis means the direction where the refractive index is highest. In addition, the refractive index and a measured wavelength of the phase difference have values in a visible broadband having a wavelength ($\lambda$) of 550 nm unless specifically described.

In the present invention, the polarization plate, unless specifically described, means a long polarization plate as well as a polarization plate cut to a size built into the LCD (the term cut includes meaning such as punch, clip, and so forth). In addition, the polarization film and the polarization plate are discriminated from each other. However, the polarization plate means a stacked structure comprising a transparent protective layer on at least one surface of the polarization film for protecting the corresponding polarization film. In addition, the structure that the protective layer may act as another layer means that the corresponding protective layer, for example, may act as a retardation region.

Hereinafter, embodiments of the present invention will be described with reference to Figures. FIG. 1 is a schematic view illustrating an example of a pixel region of the LCD of the present invention. FIGS. 2 and 3 are schematic views in accordance with an embodiment of the LCD of the present invention.

[Liquid Crystal Display]

The LCD shown in FIG. 2 includes polarization films 8 and 20, a first retardation region 10, a second retardation region 12, a pair of substrates 13 and 17, and a liquid crystal cell composed of a liquid crystal layer 15 interposed between the substrates. The polarization films 8 and 20 are interposed between the protective films 7a and 7b, and 19a and 19b, respectively.

In the LCD shown in FIG. 2, the liquid crystal cell is composed of the substrates 13 and 17 and the liquid crystal layer 15 interposed between the substrates. A multiplication $\Delta n \cdot d$ between the refractive index anisotropy $\Delta n$ and the thickness $d(\mu m)$ of the liquid crystal layer is optimal in a range of 0.2 to 0.4 $\mu m$ in the IPS type which does not have the twisted structure in the transmissive mode. In this range, a white display luminance is high and a dark state luminance is low, so that the LCD having a bright and high contrast may be obtained. An alignment film (not shown) is formed on a contact surface between the liquid crystal layer 15 and the substrates 13 and 17, and the liquid crystal molecules are aligned substantially in parallel with the surface of the substrate while the alignment direction of the liquid crystal molecules are controlled in a no voltage-applied state or a low voltage-applied state by the directions 14 and 18 of rubbing or the like carried out on the alignment layer, so that the direction of the slow axis 16 is determined. In addition, the rubbing directions are parallel in FIG. 2, however, may be anti-parallel. When the alignment directions in the substrate are determined a shown in the Figure, the liquid crystal alignment may be controlled by an optical alignment film or ion beam method. In addition, in order to enlarge the viewing angle, it is preferable to have a low tilt angle of the liquid crystal in the alignment film. In addition, an electrode (not shown in FIG. 2) capable of applying a voltage to the liquid crystal molecules is formed inside the substrate 13 or 17.

Referring to FIG. 1, the alignment of the liquid crystal molecules of one pixel region of the liquid crystal layer 15 is schematically shown. FIG. 1 is a schematic view illustrating the alignment of the liquid crystal molecules in a portion of a very small area corresponding to one pixel of the liquid crystal layer 15 along with the rubbing direction 4 of the alignment film formed inside the substrates 13 and 17, the electrodes 2 and 3 formed inside the substrates 13 and 17 and capable of applying a voltage to the liquid crystal molecules. The alignment directions of the liquid crystal molecules in the no voltage-applied state or the low voltage-applied state when active drive is carried out using a nematic liquid crystal having a positive dielectric anisotropy as a field effect type liquid crystal are denoted as 5a and 5b, and at this time, the dark state may be obtained. When a voltage is applied between the electrodes 2 and 3, the liquid crystal molecules change their alignment directions toward the directions denoted as 6a and 6b in response to the applied voltage. Typically, bright display is carried out in this state.

In addition, the liquid crystal cell used in the present invention is not limited to the IPS mode, but may be applied to any modes as long as the liquid crystal molecules of the LCD at the time of dark state are aligned in substantially parallel with the surface of the pair of substrates. Such examples may include a ferroelectric LCD, an antiferroelectric LCD, and an Electrically Controlled Birefringence (ECB) type LCD.

Referring to FIG. 2 again, the transmissive axis 9 of the polarization film 8 is disposed orthogonal to the transmissive axis 21 of the polarization film 20. In addition, the slow axis 11 of the first retardation region 10 is disposed orthogonal to the transmissive axis 9 of the polarization film 8. In addition, the transmissive axis 9 of the polarization film 8 is in parallel with the slow axis 16 of the liquid crystal molecules of the liquid crystal layer 14 at the time of dark state, that is, the slow axis 11 of the first retardation region 10 is orthogonal to the slow axis 16 of the liquid crystal layer 14 at the time of dark state of the liquid crystal. In the present aspect, the first retardation region 10 representing a specific optical property to be described later is disposed as described above while the second retardation region representing a specific optical property to be described later is disposed between the first retardation region 10 and the liquid crystal cell, so that the viewing angle of the liquid crystal cell is improved.

In the LCD shown in FIG. 2, the polarization film 8 is interposed between the two protective films 7a and 7b, however, the protective film 7b may not be formed. However, when the protective film 7b does not exist, the first retardation region 10 needs to have a function of protecting the polarization film 8 while having the specific optical property to be described later.

Cellulose acylate to be described later is preferably used for the protective film 7b and the protective film 19a disposed closer to the liquid crystal layer 15. The cellulose acylate having a low optical anisotropy (Re, Rth) used for the protective film has the in-plane retardation $Re_{(630)}$ of 10 nm or less ($0 \leq Re_{(630)} \leq 10$) and the retardation $Rth_{(630)}$ having an absolute value of 25 nm or less ($|Rth| \leq 25$ nm) in the film thickness direction in the wavelength of 630 nm. Preferably, it has $0 \leq Re_{(630)} \leq 5$ and $|Rth| \leq 20$ nm, and more preferably, has $0 \leq Re_{(630)} \leq 2$, and $|Rth| \leq 15$ nm. In addition, the cellulose acylate having a low wavelength dispersion used for the protective film has $|Re_{(400)}-Re_{(700)}| \leq 10$ and $|Rth_{(400)}-Rth_{(700)}| \leq 35$. Preferably, it has $|Re_{(400)}-Re_{(700)}| \leq 5$ and $|Rth_{(400)}-Rth_{(700)}| \leq 25$, and more preferably, it has $|Re_{(400)}-Re_{(700)}| \leq 3$ and $|Rth_{(400)}-Rth_{(700)}| \leq 15$.

In addition, the protective film 7b and the protective film 19a are preferably formed in a range of 10 to 120 μm, and more preferably, 30 to 90 μm.

In the aspect of FIG. 2, the first retardation region 10 and the second retardation region 12, based on the location of the liquid crystal cell as a reference, may be disposed between the liquid crystal cell and the polarization film 8 at the visible side, or may be disposed between the between the liquid crystal cell and the polarization film 20 at the rear side. In any aspects, the second retardation region 12 is disposed closer to the liquid crystal cell.

Another embodiment of the present invention is shown in FIG. 3. Referring to FIG. 3, same reference numerals are given to the same members as FIG. 2, so that the detailed description thereof will be skipped. The first retardation region 10 and the second retardation region 12 are replaced by each other in the LCD shown in FIG. 3, and the first retardation region 10 is disposed away from the polarization film 8 as compared to the second retardation region 12, that is, it is disposed closer to the liquid crystal cell. In addition, in the aspect shown in FIG. 3, the slow axis 11 of the first retardation region 10 is disposed in parallel with the transmissive axis 9 of the polarization film 8. In addition, the transmissive axis 9 of the polarization film 8 is in parallel with the slow axis 16 of the liquid crystal molecules of the liquid crystal layer 14 at the time of dark state, that is, the slow axis 11 of the first retardation region 10 is orthogonal to the slow axis 16 of the liquid crystal layer 14 at the time of dark state of the liquid crystal. In the present aspect, the first retardation region 10 representing the specific optical property to be described later is disposed as described above while the second retardation region 12 representing the specific optical property to be described later is disposed between the first retardation region 10 and the polarization film 8, so that the viewing angle of the liquid crystal cell is improved.

In the LCD shown in FIG. 3, the protective film 7b may not be formed, either. However, when the protective film 7b it not formed, the second retardation region 12 needs to have a function of protecting the polarization film 8 while having the specific optical property to be described later.

Cellulose acylate to be described later is preferably used for the protective film 7b or the protective film 19a. preferably, the cellulose acylate having a low optical anisotropy (Re, Rth) used for the protective film has the in-plane retardation $Re_{(630)}$ of 10 nm or less ($0 \leq Re_{(630)} \leq 10$) and the retardation $Rth_{(630)}$ having an absolute value of 25 nm or less ($|Rth| \leq 25$ nm) in the film thickness direction in the wavelength of 630 nm. More preferably, it has $0 \leq Re_{(630)} \leq 5$ and $|Rth| \leq 20$ nm, and yet more preferably, has $0 \leq Re_{(630)} \leq 2$, and $|Rth| \leq 15$ nm. In addition, the cellulose acylate having a low wavelength dispersion preferably has $|Re_{(400)}-Re_{(700)}| \leq 10$ and $|Rth_{(400)}-Rth_{(700)}| \leq 35$. More preferably, it has $|Re_{(400)}-Re_{(700)}| \leq 5$ and $|Rth_{(400)}-Rth_{(700)}| \leq 25$, and most preferably, $|Re_{(400)}-Re_{(700)}| \leq 3$ and $|Rth_{(400)}-Rth_{(700)}| \leq 15$.

In addition, thickness of the protection film 7b and the protection film 19a is preferably thin, and in particular, are preferably 80 nm or less.

In addition, in the aspect of FIG. 3, the first retardation region 10 and the second retardation region 12, based on the location of the liquid crystal cell as a reference, may be disposed between the liquid crystal cell and the polarization film 8 at the visible side, or may be disposed between the liquid crystal cell and the polarization film 20 at the rear side. In any aspects, the first retardation region 10 is disposed closer by the liquid crystal cell.

The LCD of the present invention is not limited to the structures shown in FIGS. 1 to 3, and may include other members. For example, a color filter may be disposed between the liquid crystal layer and the polarization film. In addition, the surface of the protective film for the polarization film may be subject to anti reflective processing or hard coating. In addition, the constitutional members may be given conductivity. In addition, in a case of the transmissive type, a backlight using a cold cathode, a hot cathode fluorescent lamp, a light emitting diode, a field emission device, or an electroluminescent (EL) device as a light source may be disposed in the rear surface. In this case, the backlight may be disposed at the upper or lower side of FIGS. 2 and 3, and is preferably disposed at the lower side because it is less likely to be combined with the polarization plate which has been subject to anti reflective processing or antistatic processing having a little high defect rate. In addition, a reflective polarization plate, a diffusion plate, a prism sheet, or a light guide plate may be disposed between the liquid crystal layer and the backlight. In addition, as described above, the LCD of the present invention may be a reflective type, and in this case, only one polarization plate may be disposed at the visible side, and a reflective film is disposed on an inner surface of the lower substrate of the liquid crystal cell or the rear surface of the liquid crystal cell. A front light using the light source may also be disposed at the visible side of the liquid crystal cell.

The LCD of the present invention includes an image direct view type, an image projection type, or an optical modulation type. In particular, the present invention is effective in the aspect of the active matrix LCD using three-terminal or two-terminal semiconductor devices such as TFT or MIM. It is also effective in the aspect of the passive matrix LCD which is called a time divisional driving type.

Hereinafter, preferred optical properties of various members available for the LCD of the present invention, materials used for the members, a manufacture method thereof will be described in detail.

[First Retardation Region]

In the first aspect of the LCD of the present invention, the first retardation region is disposed away from the liquid crystal cell as compared to the second retardation region as shown in FIG. 2. In the present aspect, the in-plane retardation of the first retardation region is 70 nm to 330 nm. In order to effectively reduce the optical leakages in the inclined direction, the retardation of the first retardation region is preferably 90 nm to 250 nm, and more preferably 110 nm to 190 nm. In addition, Nz defined as $Nz=Rth/Re+0.5$ using the in-plane retardation (Re) and the retardation (Rth) of the thickness direction is greater than 0 and less than 0.5, and Nz of the first retardation region is preferably 0.1 to 0.35 in order to effectively reduce the optical leakages in the inclined direction. When it exceeds 0.5, the retardation value required for enhancing the contrast increases, which causes a very high accuracy required for attachment with the polarization plate, and the retardation required for the second retardation region increases, which is not preferable.

Further, in the LCD of the present aspect, the slow axis of the first retardation region is disposed orthogonal to the transmissive axis of the polarization film disposed closer to the first retardation region and the slow axis of the liquid crystal layer at the time of dark state.

Furthermore, in another aspect of the LCD of the present invention, the first retardation region is disposed closer to the liquid crystal cell as compared to the second retardation region as shown in FIG. 3. In the present aspect, the first retardation region has the in-plane retardation Re of 80 nm to 230 nm. In order to effectively reduce the optical leakages in the inclined direction, the retardation of the first retardation region is preferably 100 nm to 210 nm, and more preferably 110 nm to 190 nm. In addition, Nz defined as $Nz=Rth/Re+0.5$ using the in-plane retardation (Re) and the retardation (Rth) of the thickness direction is greater than 0 and less than 0.4, and Nz of the first retardation region is preferably 0.1 to 0.35 in order to effectively reduce the optical leakages in the inclined direction. When it exceeds 0.4, the retardation value required for enhancing the contrast increases, which causes a very high accuracy required for attachment with the polarization plate, and the retardation required for the second retardation region increases, which is not preferable.

In addition, in the LCD of the present aspect, the slow axis of the first retardation region is disposed in parallel with the transmissive axis of the polarization film disposed closer to the first retardation region and the slow axis of the liquid crystal layer at the time of dark state.

In the present invention, a material and a shape of the first retardation region are not particularly limited as long as the first retardation region has the optical property. For example, all of a retardation film formed of a birefringence polymer film, and a retardation film formed of birefringence polymer film, a film heated after a polymer compound is coated on a transparent support, and or a retardation film comprising a retardation layer formed by coating or transferring a monomer or polymer liquid crystalline compound onto the transparent support, may be used. In addition, each of the retardation films may be stacked one on top of another.

Preferably, the birefringence polymer film has superior controllability of the birefringence, transparency, thermal endurance, and low photoelasticity. In this case, a polymer material therefore is not particularly limited as long as the material may have the uniform biaxial alignment, however, the polymer material is preferably prepared as a film by a solution casting method or an extrusion molding method, and examples thereof may include norbornene polymer, polycarbonate polymer, polyarylate polymer, polyester polymer, aromatic polymer such as polysulfone, polyolefin such as polypropylene, cellulose acylate, or polymer mixed with at least two kinds thereof.

The biaxial alignment of the film may be carried out by stretching the film formed by an adequate manner such as extrusion molding or casting film preparation by means of a vertical stretching technique using a roll, a horizontal stretching technique using a tenter, or a biaxial stretching technique or the like. In addition, the film may be obtained by controlling a refractive index of the thickness direction by a uniaxial stretching or biaxial stretching in the plane direction and also stretching in the thickness direction. In addition, it may be obtained by attaching a thermal contraction film to the polymer film and stretching and/or contracting the polymer film under the contraction force due to heating (see JP-A-5-157911, JP-A-11-125716, and JP-A-2001-13324). The vertical stretching technique using the roll may employ an adequate heating method such as a method of using a heating roll, a method of heating the atmosphere, or a method of using them together. In addition, the biaxial stretching technique using the tenter may employ an adequate method such as a simultaneous and biaxial stretching method using a total tenter or a gradual biaxial stretching method using the roll-tenter methods.

In addition, the alignment deviation or the phase difference deviation is preferably small. The thickness may be adequately determined by the phase difference or the like, 1 to 300 μm is preferable in terms of thin film formation, more preferably 10 to 200 μm, and yet more preferably 20 to 150 μm.

Examples of the liquid crystalline polymer may include main chain types or a measuring chain types in which a conjugative straight line-shaped atom group (mesogen) giving liquid crystal alignment is introduced to the main chain or the measuring chain of the polymer, and so forth. Specific examples of the main chain type liquid crystalline polymer may include, a nematic aligned type polyester mesogen liquid crystalline polymer, a discotic polymer or cholesteric polymer having a structure connected with the mesogen group in the spacer unit giving the flexibility. Specific examples of the measuring chain type liquid crystalline polymer may include, polymer having the mesogen composed of para-substituted ring-shaped compound units which give the nematic alignment property through the spacer unit composed of conjugative atom groups as the measuring chain using polysiloxane, polyacrylate, polymethacrylate or polymalonate as the main chain frame. These alignment films of the liquid crystalline polymers are subject to annealing by developing a liquid crystalline polymer solution onto the alignment processed surfaces such as rubbed thin surfaces like polyimide or polyvinyl alcohol formed on a glass plate or oblique evaporated with SiO, preferably, tilt-aligned surfaces.

When the first retardation film and the polarization film, or the corresponding polarization film needs to be stacked with protection, it is preferable in terms of axial attachment accuracy to continuously attach the contraction axis of the polarization axis to the slow axis of the first retardation film to be orthogonal to each other or in parallel with each other.

[Second Retardation Region]

In the first aspect of the LCD of the present invention, the second retardation region is disclosed in a location closer to the liquid crystal cell as compared to the first retardation region as shown in FIG. 2. In the present aspect, the in-plane retardation is 50 nm or less, and preferably 20 nm or less. In addition, the retardation of the thickness direction of the second retardation region is 10 nm to 140 nm, preferably 30 nm to 130 nm, and more preferably 60 nm to 110 nm.

In addition, the location of the slow axis of the second retardation region is not particularly limited in the present aspect, however, when Re in the second retardation region exceeds 20 nm, it is preferably to make the slow axis of the second retardation region disposed in parallel with the transmissive axis of the polarization film disposed closer to the second retardation region. Accordingly, a thickness of the first retardation region may be thin. In addition, the optical axis is not included in the in-plane of the second retardation region in the present invention.

More particularly, the Rth of the second retardation region is preferably 30 nm to 100 nm when the Nz of the first retardation region is equal to 0.3 or more and less than 0.4, and the Rth of the second retardation region is preferably 80 nm to 120 nm when the Nz of the first retardation region is greater than 0 and equal to 0.2 or less. The Rth of the second retardation region is preferably 50 to 100 nm when the Nz of the first retardation region is greater than 0.2 and less than 0.3. In this case, the range is preferable when the LCD of the present aspect has at least one protective film for protecting the polarization film between the liquid crystal cell and the polarization film and the retardation of a thickness direction of the corresponding protective layer is 40 nm to −100 nm.

In an aspect other than the LCD of the present invention shown in FIG. 3, the second retardation region is disposed away from the liquid crystal cell as compared to the first retardation region. The second retardation region has the in-plane retardation of 50 nm or less, preferably 20 nm or less. In addition, the retardation of the thickness direction is 20 nm to 120 nm, preferably 25 nm to 100 nm, and more preferably 30 nm to 80 nm.

In addition, the location of the slow axis of the second retardation region is not particularly limited in the present aspect, however, it is preferably to make the slow axis of the second retardation region vertically disposed to the transmissive axis of the polarization film disposed closer to the second retardation region. Accordingly, a thickness of the first retardation region may be thin. In addition, the optical axis is not included in the in-plane of the second retardation region in the present invention.

More particularly, the second retardation region to be described later is preferably 30 nm to 40 nm when the Nz of the first retardation region is equal to 0.3 or more and less than 0.4, and the retardation of the second retardation region is preferably 70 nm to 80 nm when the Nz of the first retardation region is greater than 0 and equal to 0.2 or less. The retardation of the second retardation region is preferably 50 to 70 nm when the Nz of the first retardation region is greater than 0.2 and less than 0.3. In this case, the range is preferable when the LCD of the present aspect has at least one protective film for protecting the polarization film between the liquid crystal cell and the polarization film and the retardation of a thickness direction of the corresponding protective layer is 40 nm to −50 nm.

A material of the second retardation region is not particularly limited as long as the second retardation region has the optical property. For example, all of a retardation film formed of a birefringence polymer film, and a retardation film having a retardation layer formed by coating or transferring a monomer or polymer liquid crystalline compound onto a transparent support, may be used. In addition, each of the retardation films may be stacked one on top of another. In addition, the second retardation region may act as the protective film of the polarization plate adjacent to the corresponding second retardation region.

The retardation layer formed of the birefringence polymer film having the optical property may be easily formed only uniaxially and biaxially stretching a polymer film (See JP-A-2002-139621 and JP-A-2002-146045). In addition, kinds of cellulose acylate revealing the optical property by casting without stretching may be preferably used. Examples of the cellulose acylate may be found in JP-A-2000-275434, JP-A-2001-166144, JP-A-2002-161144, and JP-A-2002-90541. In general, a synthesized polymer (e.g. polycarbonate, polysulfone, polyethersulfone, polyacrylate, polymethacrylate, norbornene resin, cellulose acylate) may be used as the material of the polymer film.

The retardation layer formed of the liquid crystalline compound having the optical property may be formed by coating a bar-shaped cholesteric liquid crystalline composition including chiral structure units onto the support or a temporary support, aligning its spiral axis to a substantially vertical direction to the substrate, and fixing the same. When the retardation layer is formed on the temporary support, it may be disposed by transferring the retardation layer onto the support.

In addition, the retardation layer fixed by horizontally aligning a discotic liquid crystalline compound having a negative birefringence (while vertically aligning the director to the substrate), and the retardation layer fixed by casting polyimide polymers on the substrate, may be used in the same manner. Further, not only one retardation layer but a plurality of retardation layers may be stacked one on top of another to constitute the second retardation region representing the optical property. In addition, the optical property may be filled in the total stacked layer of the support and the retardation layer to constitute the second retardation region.

The second retardation region including the retardation layer formed of a discotic liquid crystalline compound, may be formed by coating a coating solution containing a discotic liquid crystalline compound, or a copolymer initiator, an air interface horizontal alignment material (e.g. described in JP-A-2003-388308), and an additive not described above, onto a horizontal alignment layer formed on a support. A polymeric alignment layer such as polyvinyl alcohol, polyimide, polyamide, acryl or the like containing a solid content such as an organic acid or salt by 0.1% or less by mass, may be used as the alignment layer for horizontally aligning the discotic liquid crystal layers. Rubbing may be carried out after the alignment layer is formed, or may not be carried out.

Alternatively, examples of the available discotic liquid crystalline compound, examples of the solvent used for preparing the coating solution, examples of the coating method, other materials such as copolymer initiator and copolymer monomer, and support materials used for forming the retardation layer, are preferably described in JP-A-2004-37835.

[Protective Film for Polarization Film]

Among protective films for polarization plate used in the LCD of the present invention, a cellulose acylate film is used as the protective film close to the liquid crystal layer. That is, the protective film meets any one condition between (1) and (2) denoted below.

(1) The cellulose acylate film meeting the formula (I) and (II) denoted below.

$$0 \leq Re_{(630)} \leq 10, \text{ and, } |Rth_{(630)}| \leq 25 \quad (I)$$

$$|Re_{(400)} - Re_{(700)}| \leq 10, \text{ and, } |Rth_{(400)} - Rth_{(700)}| \leq 35 \quad (II)$$

In the formulae (I) and (II), $Re_{(\lambda)}$ represents an in-plane retardation (nm) in the wavelength $\lambda$ nm, and $Rth_{(\lambda)}$ represents a retardation (nm) of a film thickness direction in the wavelength $\lambda$ nm.

(2) The protective film containing the compound decreasing the Rth so that the Rth of the thickness direction of the protective film meets the formulae (III) and (IV) denoted below.

$$(Rth_{(A)} - Rth_{(0)})/A \leq -1.0 \quad (III)$$

$$0.01 \leq A \leq 30 \quad (IV)$$

In the formulae III and IV, Rth(A) represents the Rth (nm) of the cellulose acylate film containing the compound decreasing the Rth by A %, $Rth_{(0)}$ represents the Rth (nm) of the cellulose acylate film not containing the compound decreasing the Rth($\lambda$), and A represents % by weight of the compound decreasing the Rth($\lambda$) with respect to a material polymer of the cellulose acylate film.

Hereinafter, the cellulose acylate film will be explained in details, which is preferably used in the invention.

A raw material cellulose for the cellulose acylate include, for example a cotton linter, a wood pulp (such as a hardwood pulp or a softwood pulp) and the like, and a cellulose acylate obtained from any raw material cellulose may be used and may be used as a mixture if desirable. Such raw material cellulose is described in detail, for example in *Plastic Zairyo Koza* (17) *Senisokeijyushi* (cellulose resin) (Marusawa and Uda, published by Nikkan Kogyo Shimbun, 1970) and *Japan Institute of Invention and Innovation,* Technical Publication 2001-1745 (pp. 7-8), and is not particularly limited for the cellulose acylate film of the invention.

(Substitution Degree of Cellulose Acylate)

The cellulose acylate to be used in the invention is, for example, formed by an acylation of hydroxyl groups of cellulose, and a substituent thereof can be any acetyl group from an acyl group with 2 to 22 carbon atoms. In the cellulose acylate to be used in the invention, a substitution degree on the hydroxyl groups of cellulose is not particularly limited, and can be obtained by measured by a bonding level of an acetic acid and/or an aliphatic acid with 3 to 22 carbon atoms, which substitutes the hydroxyl groups of cellulose, and calculating the substitution degree. Such measurement can be conducted according to ASTM, D-817-91.

As described above, the substitution degree in the hydroxyl groups of cellulose in the aforementioned cellulose acrylate of the invention is not particularly limited, but an acyl substitution degree in the hydroxyl groups of cellulose is preferably 2.50 to 3.00, more preferably 2.75 to 3.00 and further preferably 2.85 to 3.00.

Among the acetic acid and/or the aliphatic acid of 3 to 22 carbon atoms for substituting the hydroxyl groups of cellulose, the acyl group with 2 to 22 carbon atoms may be an aliphatic group or an allyl group and may be a single group or a mixture of two or more kinds. It can, for example, be an alkylcarbonyl ester, an alkenyl carbonyl ester, an aromatic carbonyl ester or an aromatic alkylcarbonyl ester of cellulose, each of which may further have a substituent. Preferred examples of such acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleoyl group, a benzoyl group, a naphthylcarbonyl group, a cinnamoyl group or the like, among which preferred is an acetyl group, a propionyl group, a butanoyl group, a dodecanoyl group, an octadecanoyl group, a tert-butanoyl group, an oleoyl group, a benzoyl group, a naphthylcarbonyl group, a cinnamoyl group and the like, and more preferably an acetyl group, a propionyl group and a butanoyl group.

As a result of an intensive investigation by the present inventors of the invention, it is found, when the acyl substituents on the hydroxyl groups of the cellulose are substantially constituted of at least two of an acetyl group, a propionyl group and a butanoyl group, that the optical anisotropy of the cellulose acylate film can be lowered in case of a total substitution degree of 2.50 to 3.00. The acyl substitution degree is more preferably 2.60 to 3.00, and further preferably 2.65 to 3.00.

(Polymerization Degree of the Cellulose Acrylate)

The cellulose acylate preferably used in the invention has a polymerization degree, in a viscosity-average polymerization degree, of 180 to 700, in case of cellulose acetate, more preferably 180 to 550, further preferably 180 to 400 and particularly preferably 180 to 350. An excessively high polymerization degree increases a viscosity of a dope solution of the cellulose acylate, thereby rendering film preparation by a casting method difficult, while an excessively low polymerization degree deteriorates the strength of the prepared film. An average polymerization degree can be measured by a limiting viscosity method of Uda et al. (Kazuo Uda and Hideo Saito, Bulletin of The Society of Fiber Science and Technology, Japan, vol. 18, No. 1, pp. 105-120, 1962). This method is described in details in Paragraph Nos. 0014 to 0015 of JP-A No. 9-95538.

The molecular weight distribution of the cellulose acylate preferably employed in the invention is evaluated by a gel permeation chromatography and is preferably narrow, with a small dispersion index Mw/Mn (Mw: mass-average molecular weight, Mn: number-average molecular weight). A specific range of Mw/Mn value is preferably 1.0 to 3.0, more preferably 1.0 to 2.0, and most preferably 1.0 to 1.6.

An elimination of low-molecular components results in an average molecular weight (polymerization degree) increasing, but makes the viscosity become lower than a conventionally used cellulose acylate, and thus, such elimination is useful. Cellulose acylate having reduced low-molecular components can be obtained by eliminating low-molecular components from cellulose acylate synthesized by a well-known method. The elimination of the low-molecular components can be effected by rinsing the cellulose acylate with an appropriate organic solvent. In case of preparing cellulose acylate having reduced low-molecular components, an amount of a sulfuric acid catalyst in the acylation reaction is preferably adjusted within a range of 0.5 to 25 parts by mass, with respect to 100 parts by mass of cellulose. The amount of a sulfuric acid catalyst within the aforementioned range makes it possible to synthesize cellulose acylate that is adequate in the molecular weight distribution (with uniform molecular weight distribution). In the preparation of the cellulose acylate according to the invention, the cellulose acylate preferably has a water content of 2 mass % or less, more preferably 1 mass % or less and particularly preferably 0.7 mass % or less. The cellulose acylate is known to generally contain water, in an amount of 2.5 to 5 mass %. In order to attain the aforementioned water content of the cellulose acylate in the invention, drying is required. The method of drying is not particularly restricted so long as the required water content can be attained. For the cellulose acylate of the invention, a raw material cotton and a synthesizing method are described in detail in Japan Institute of Invention and Innovation, Technical Publication (Technical Publication No. 2001-1745, pp. 7-12, Mar. 15, 2001, published by Japan Institute of Invention and Innovation).

The cellulose acylate may be employed singly or in a mixture of two or more kinds, provided that the substituent, the substitution degree, the polymerization degree, and the molecular weight distribution are within the aforementioned ranges.

(Additive to Cellulose Acylate)

To a solution of the cellulose acylate may be added various additives (for example, a compound for reducing optical anisotropy (particularly compound for reducing Rth), a wavelength dispersion-regulating agent, an anti-ultraviolet agent, a plasticizer, an anti-deterioration agent, fine particles or an optical property-regulating agent) depending on various purposes in each of the preparation steps, and such additives will be explained in the following. And such addition may be carried out in any of the steps of preparing a dope, or may be carried out by adding a step of adding such additives to the final preparation step in the process for preparing dope.

The cellulose acylate film that can be used in the invention preferably contains a compound for reducing Rth so that Rth in the direction of film thickness satisfies the following Formulae (III) and (IV).

$(Rth_{(A)} - Rth_{(0)})/A \leq -1.0$ (III)

$0.01 \leq A \leq 30$ (IV)

In the Formulae (III) and (IV), $Rth_{(A)}$ represents Rth (nm) of a protective film containing A % of the compound for reducing Rth, $Rth_{(0)}$ represents Rth (nm) of the protective film that is a film without the compound for reducing Rth, and A represents a weight (%) of the compound for reducing Rth when the weight of the raw material polymer for the film is 100.

The above-mentioned Formulae (III) and (IV) are further preferably $(Rth_{(A)} - Rth_{(0)})/A \leq -2.0$ and (III-I)

$0.1 \leq A \leq 20$. (IV-I)

(Structural Feature of Compound for Reducing Rth of Cellulose Acylate Film)

In the following, there will be explained a compound for reducing Rth of the cellulose acylate film. As a result of intensive investigations, the present inventors employ a compound capable of suppressing an alignment of cellulose acylate in the film along the in-plane direction and the direction of film thickness, thereby sufficiently reducing Rth so that both an Re value and an Rth value can be nearly 0. In this respect, nearly 0 means for example −25 nm to 25 nm. For this purpose, it is advantageous that the compound for reducing Rth is sufficiently compatible with cellulose acylate and does not have a rod-shaped structure or a planar structure in the compound itself. Specifically, in case that the compound has plural planar functional groups such as aromatic groups, it is advantageous that the compound has a non-planar structure that does not have said functional groups on the same plane.

(Log P Value)

In the preparation of the cellulose acylate film according to the invention, among the aforementioned compound for suppressing an alignment of cellulose acylate in the film along the in-plane direction and the direction of film thickness thereby sufficiently reducing Rth, preferred is a compound having an octanol-water distribution coefficient (log P value) within a range of from 0 to 7. A compound having a log P value of 7 or below shows improved compatibility with cellulose acylate, thus tending to suppress a white turbidity or a powdery formation in the film. Also, a compound having a log P value or 0 or more has a lower hydrophilicity and thus can suppress deterioration of the water resistance of the cellulose acylate film. The log P value is more preferably within a range of from 1 to 6, and particularly preferably 1.5 to 5.

The octanol-water distribution coefficient (log P value) can be measured by a flask permeation method described in Japan Industrial Standards (JIS) Z7260-107 (2000). The octanol-water distribution coefficient (log P value) may also be estimated, instead of an actual measurement, by a calculational chemical method or an empirical method. As a calculation method, Crippen's fragmentation method (J. Chem. Inf. Comput. Sci., 27, 21 (1987)), Viswanadhan's fragmentation method (J. Chem. Inf. Comput. Sci., 29, 163 (1989)), or Broto's fragmentation method (Eur. J. Med. Chem.-Chim. Theor., 19, 71 (1984)), and the like is are preferably used, and the Crippen's fragmentation method (J. Chem. Inf. Comput. Sci., 27, 21 (1987)) is more preferably used. In case that a compound shows different log P values depending on the measuring method or the calculation method, the Crippen's fragmentation method is preferably used for judging as to whether the compound is within a range of the invention.

(Physical Properties of Compound for Reducing Rth)

A compound for reducing Rth may or may not include an aromatic group. The compound for reducing Rth preferably has a molecular weight of 150 to 3000, more preferably 170 to 2000, and particularly preferably 200 to 1000. Such compound may have, within such range of the molecular weight, a specified monomer structure, or an oligomer structure or a polymer structure formed by a bonding of a plurality of such monomer unit.

The compound for reducing Rth is preferably either a liquid at 25° C. or a solid having a melting point of 25° C. to 250° C. and more preferably either a liquid at 25° C. or a solid having a melting point of 25° C. to 200° C. Also, the compound for reducing Rth preferably does not evaporate in the course of casting and drying a dope solution for preparing the cellulose acylate film.

An amount of addition of the compound for reducing Rth is preferably 0.01 mass % to 30 mass % of the cellulose acylate, more preferably 1 mass % to 25 mass %, and particularly preferably 5 mass % to 20 mass %.

The compound for reducing Rth may be employed singly or in a mixture of two or more kinds in an arbitrary ratio.

The compound for reducing Rth may be added any time in the process of preparation of a dope solution, or at the end of such process.

The compound for reducing Rth has an average content, in a portion from at least a surface of the cellulose acylate film to a position of 10% of the total film thickness, of 80% to 99% of an average content of such compound in a central portion of the cellulose acylate film. An amount of the compound of the invention can be determined by measuring amounts of the compound in a surface portion and a central portion by a method utilizing an infrared absorption spectrum, as described in JP-A-8-57879, and the like.

Hereinbelow, specific examples of the compounds for reducing Rth of the cellulose acylate film which are preferably used in the invention are given.

Compounds of Formula (13) and Formula (18) below can be exemplified as compounds for reducing Rth.

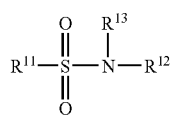

Formula (13)

In Formula (13), $R^{11}$ represents an alkyl group or an aryl group, and $R^{12}$ and $R^{13}$ each independently represent a hydrogen atom, an alkyl group or an aryl group. Further, the total number of the carbon atoms of $R^{11}$, $R^{12}$ and $R^{13}$ is particularly preferably 10 or greater. $R^{11}$, $R^{12}$ and $R^{13}$ may have a substituent. The substituent is preferably a fluorine atom, an alkyl group, an aryl group, an alkoxyl group, a sulfone group, a sulfonamide group and cyano group, and particularly preferably an alkyl group, an aryl group, an alkoxyl group, a sulfone group and a sulfonamide group. Further, the alkyl group may be straight-chained, branched or cyclic, and preferably has 1 to 25 carbon atoms, more preferably 6 to 25 carbon atoms, and particularly preferably 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclo octyl, nonyl, adamanthyl, decyl, t-octyl, undecyl, dodecyl, tridecyl, tetradecyl, pentadecyl, hexadecyl, heptadecyl, octadecyl, nonadecyl, didecyl). The aryl group preferably has 6 to 30 carbon atoms, and particularly preferably 6 to 24 carbon atoms (for example, phenyl, biphenyl, terphenyl, naphthyl, binaphthyl, triphenyl phenyl).

Formula (18)

In the Formula (18), $R^{14}$ represents an alkyl group or an aryl group, $R^{15}$ and $R^{16}$ each independently represent a hydrogen atom, an alkyl group or an aryl group.

$R^{14}$ is preferably a phenyl group or, a cyclic alkyl group. $R^{15}$ and $R^{16}$ are each preferably a phenyl group or an alkyl group. The alkyl group may be preferably any of a cyclic alkyl group and a linear alkyl group.

These groups may have a substituent, and preferred examples of the substituent include a fluorine atom, an alkyl group, an aryl group, an alkoxy group, a sulfone group and a sulfonamide group, and particularly preferred examples of the substituent include an alkyl group, an aryl group, an alkoxy group, a sulfone group and a sulfonamide group.

A compound represented by the Formula (18) is more preferably a compound represented by the Formula (19).

Formula (19)

In the above Formula (19), $R^{114}$, $R^{115}$ and $R^{116}$ each independently represent an alkyl group or an aryl group. The alkyl group may be preferably any of a cyclic alkyl group and a linear alkyl group, and the aryl group is preferably a phenyl group.

Hereinafter, preferred examples of a compound represented by the Formula (13) are shown below, but the invention is not limited to these specific examples. Furthermore, $Pr^i$ in the compounds means an isopropyl group (Hereinafter, the same).

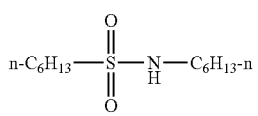

A-1

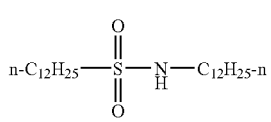

A-2

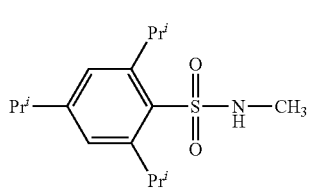

A-3

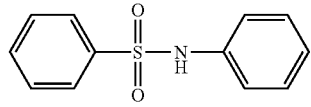

A-4

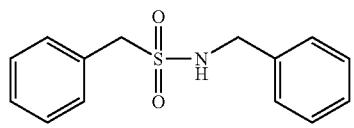
A-5
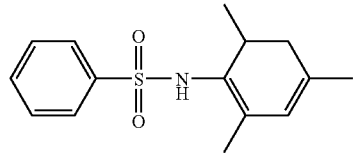
A-6
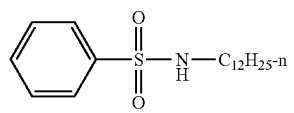
A-7
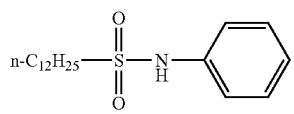
A-8
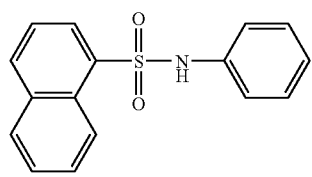
A-9
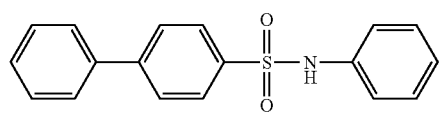
A-10
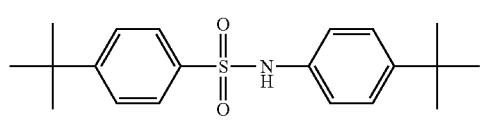
A-11
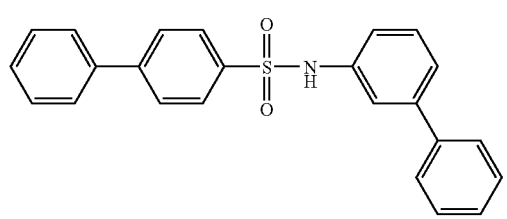
A-12
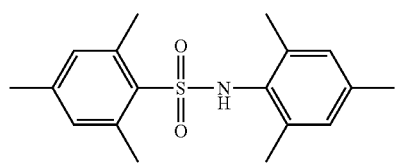
A-13
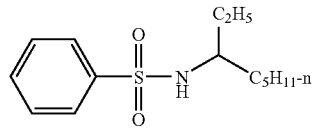
A-14
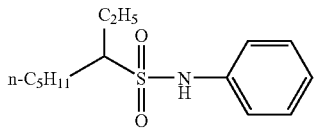
A-15
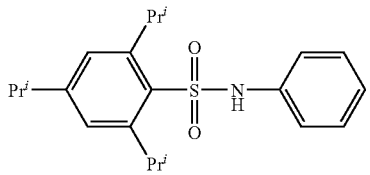
A-16
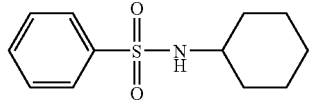
A-17
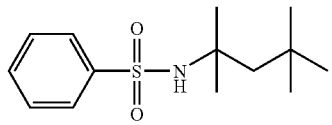
A-18
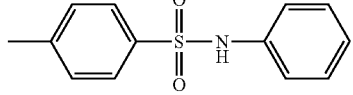
A-19
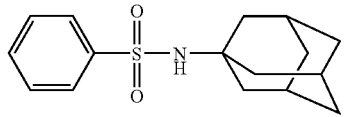
A-20
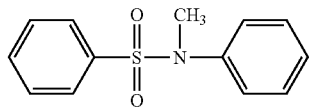
A-21
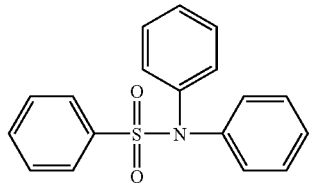
A-22
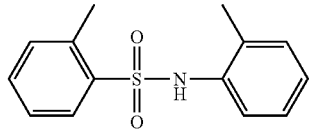
A-23
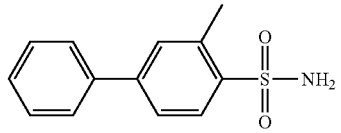
A-24
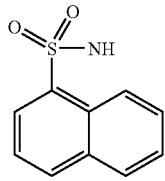
A-25

-continued
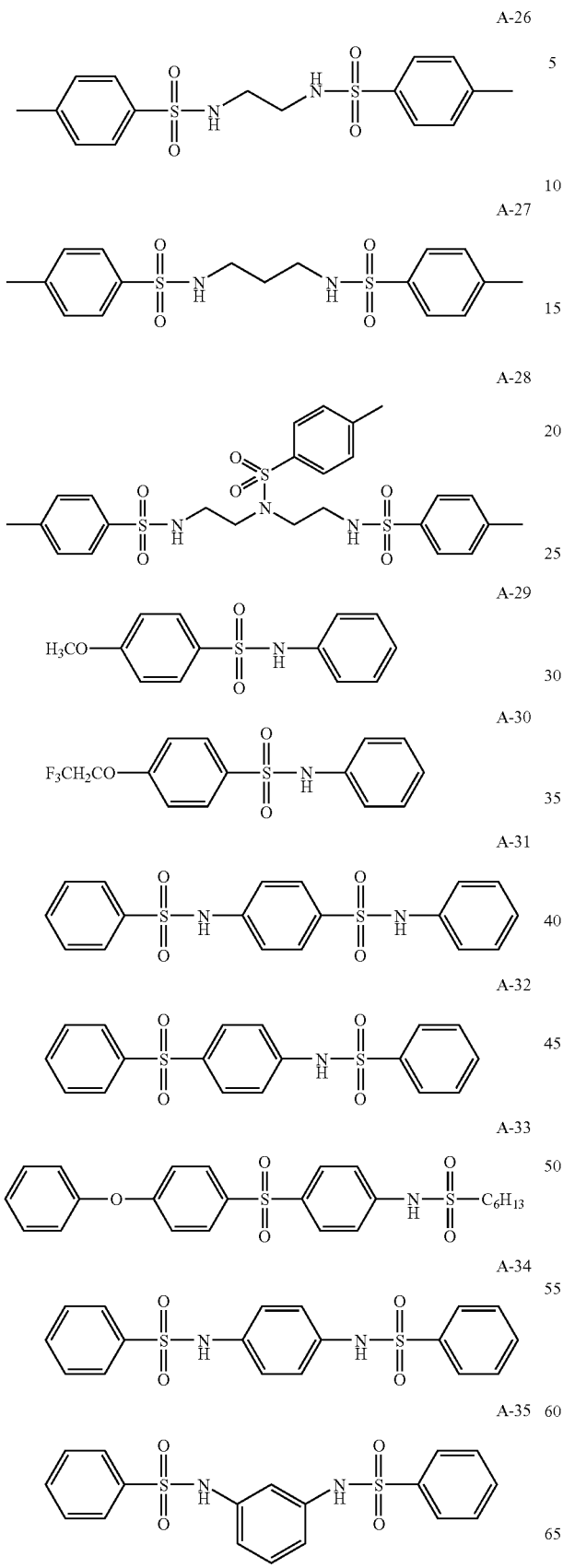
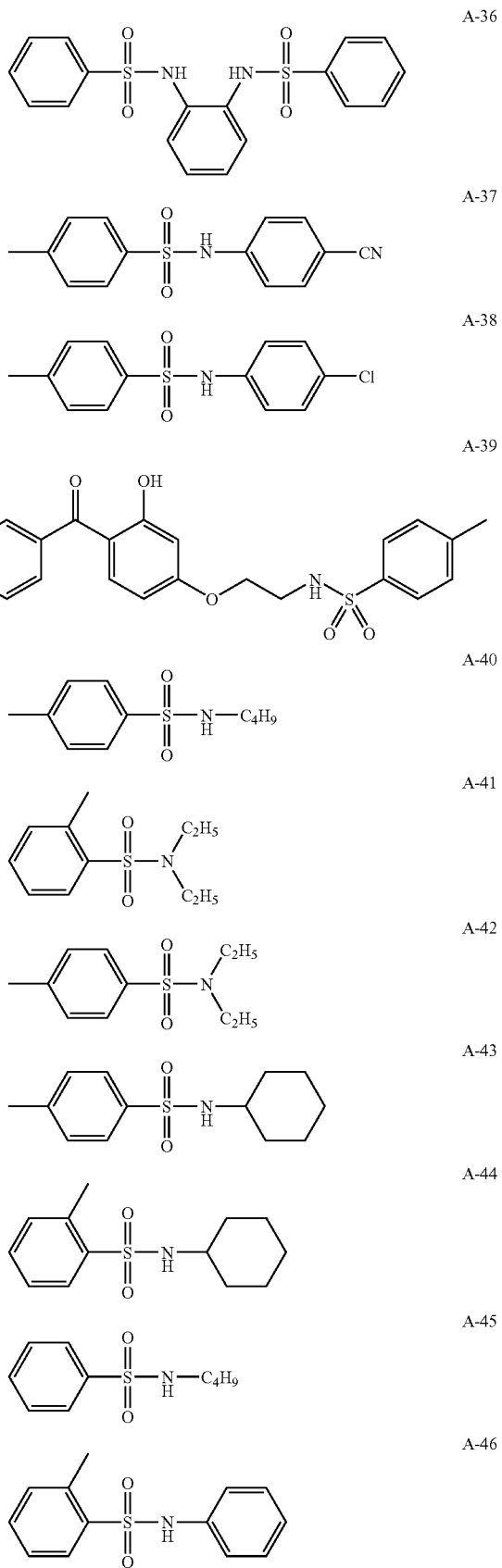

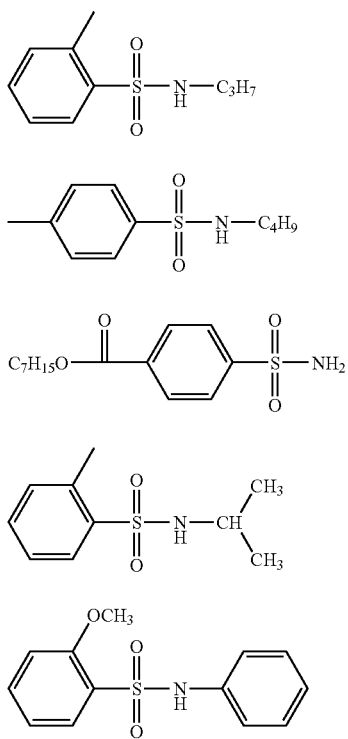
Hereinafter, preferred examples of a compound represented by the Formula (18) and the Formula (19) are shown below, but the invention is not limited to these specific examples. Furthermore, $Bu^i$ in the compounds means an isobutyl group
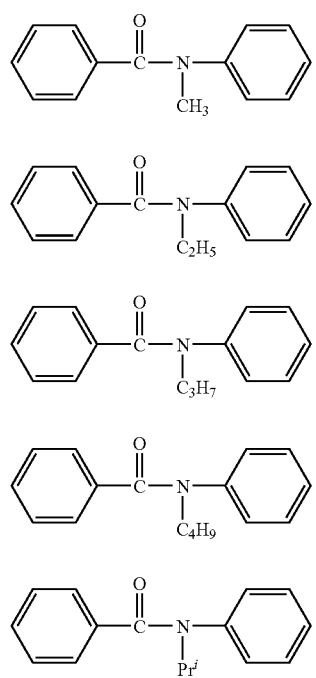
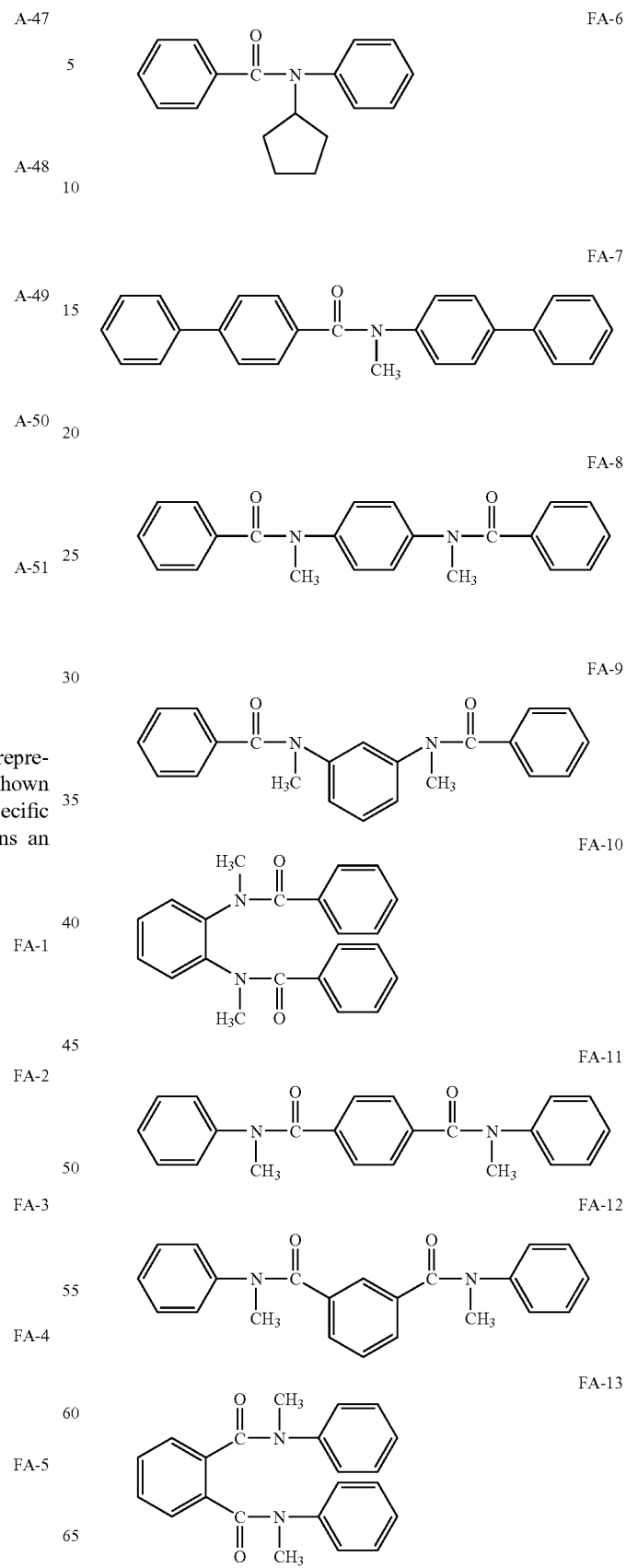

-continued
FA-14
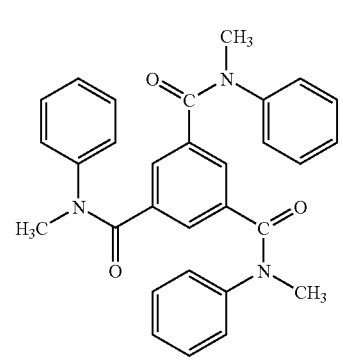
FA-15
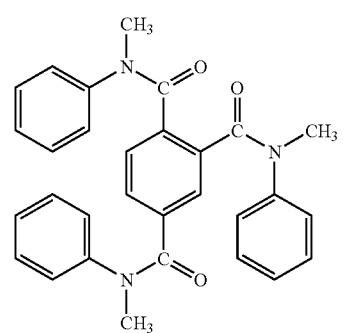
FA-16
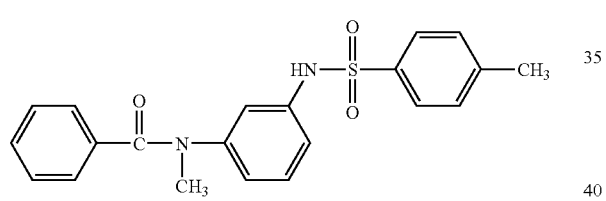
FA-17
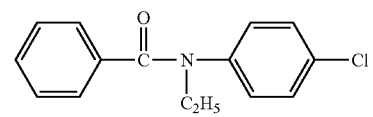
FA-18
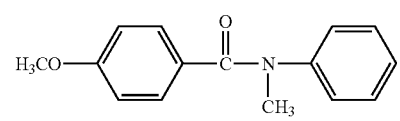
FA-19
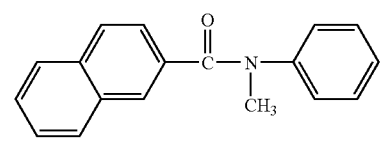
FA-20
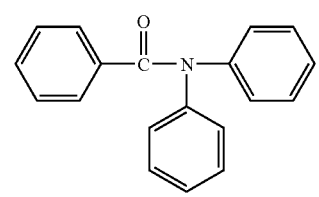
-continued
FA-21
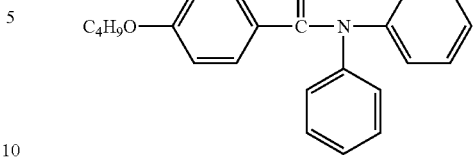
FA-22
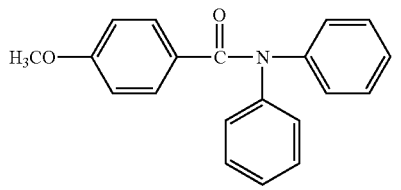
FA-23
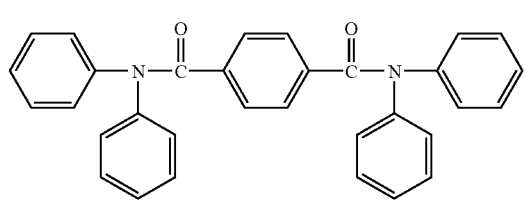
FA-24
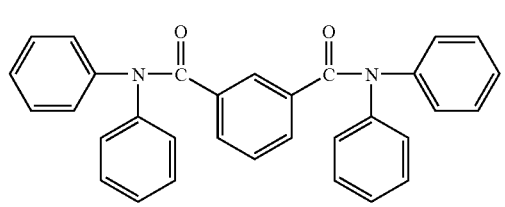
FA-25
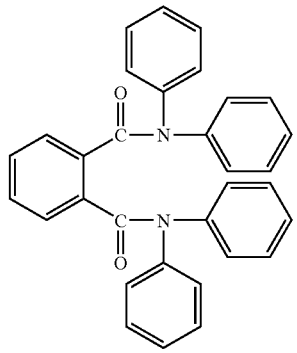
FA-26
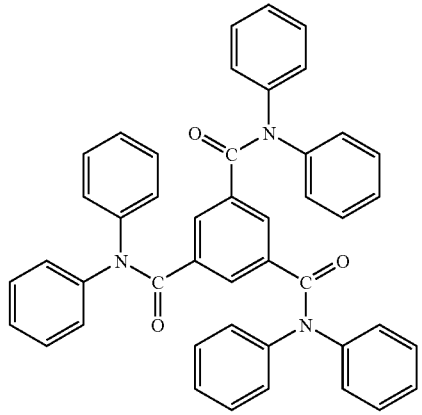

-continued
FA-27
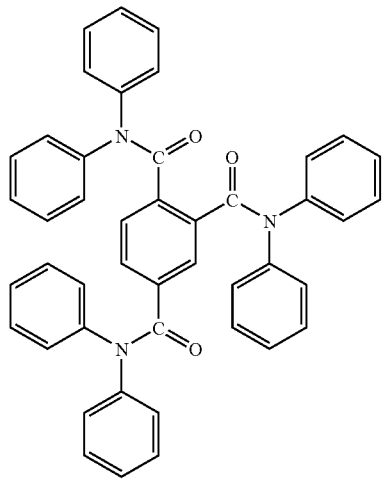
FA-28
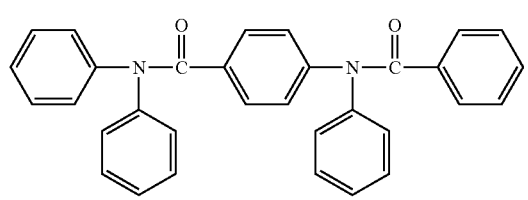
FB-1
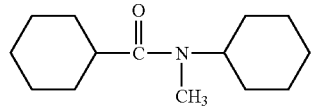
FB-2
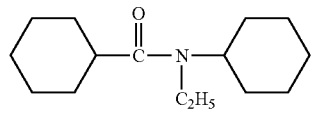
FB-3
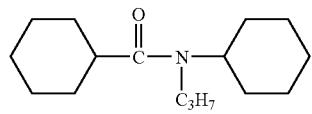
FB-4
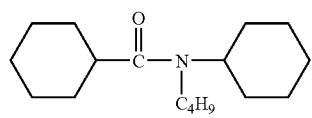
FB-5
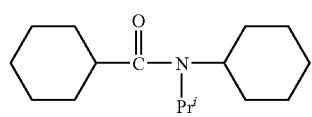
FB-6
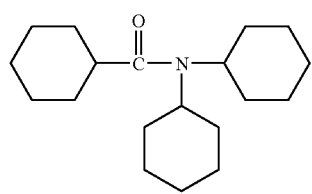
-continued
FB-7
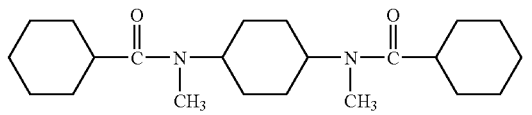
FB-8
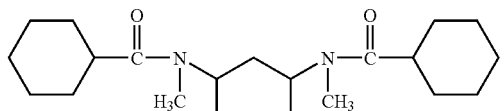
FB-9
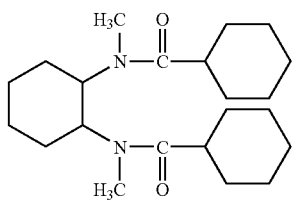
FB-10
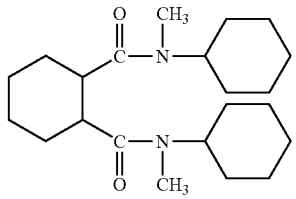
FB-11
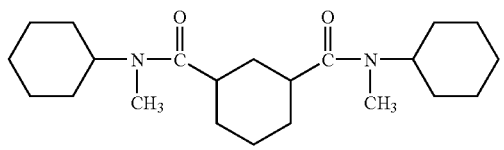
FB-12
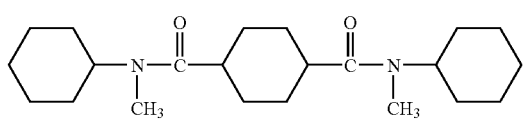
FB-13
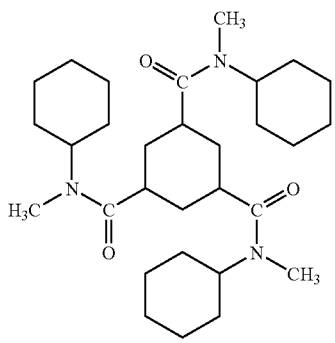
FB-14
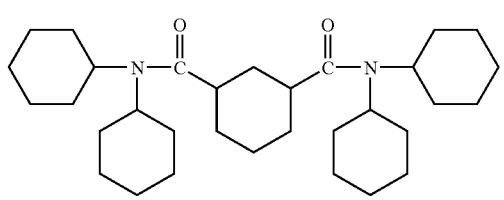

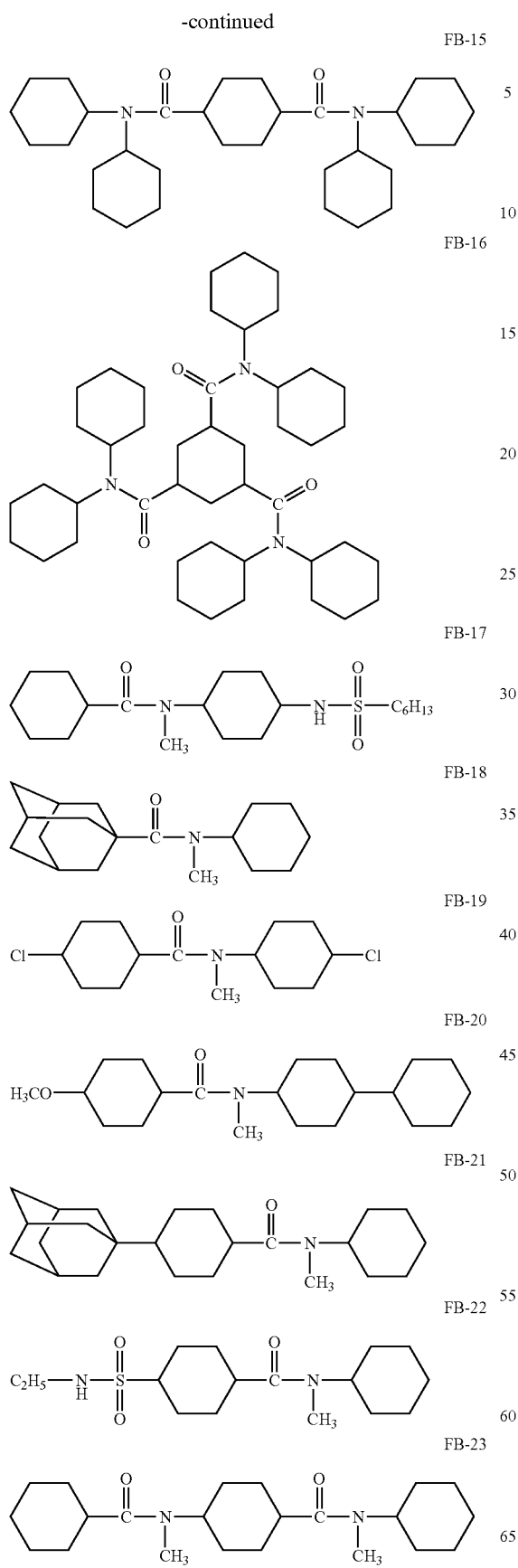
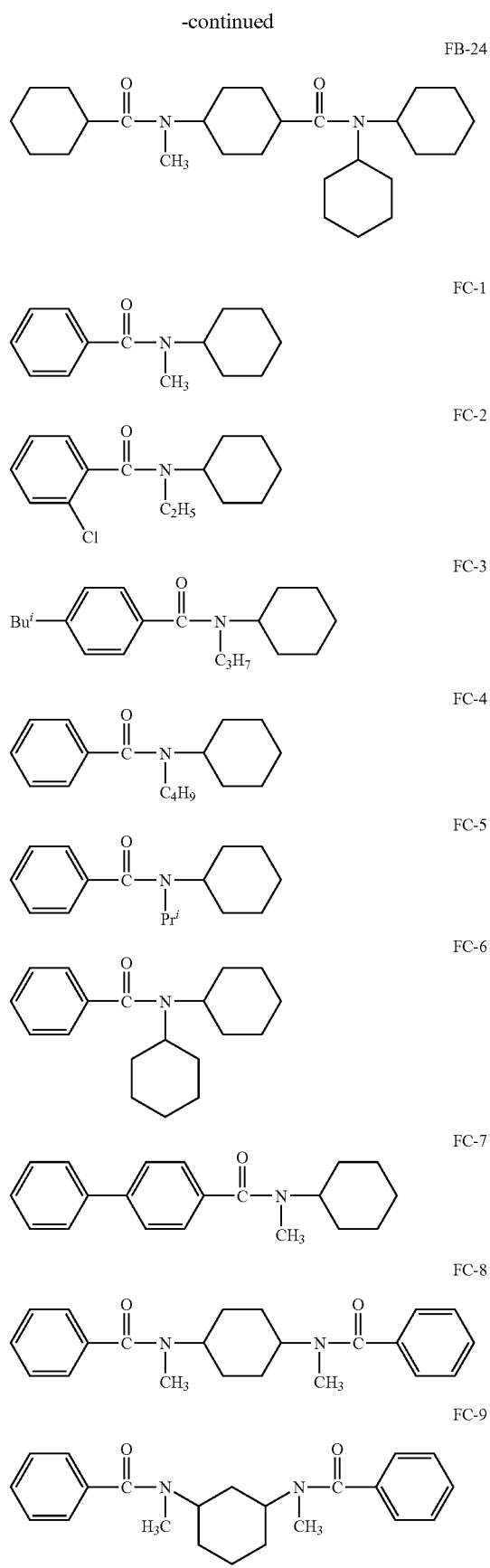

-continued

FC-10, FC-11, FC-12, FC-13, FC-14, FC-15, FC-16

FC-17, FC-18, FC-19, FC-20, FC-21, FC-22, FC-23, FC-24, FC-25

-continued
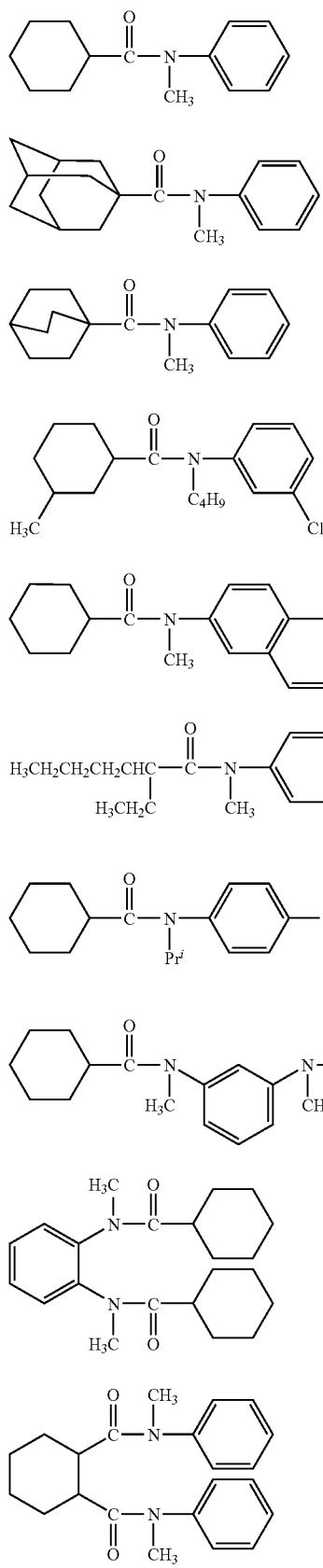
FD-1
FD-2
FD-3
FD-4
FD-5
FD-6
FD-7
FD-8
FC-9
FD-10
-continued
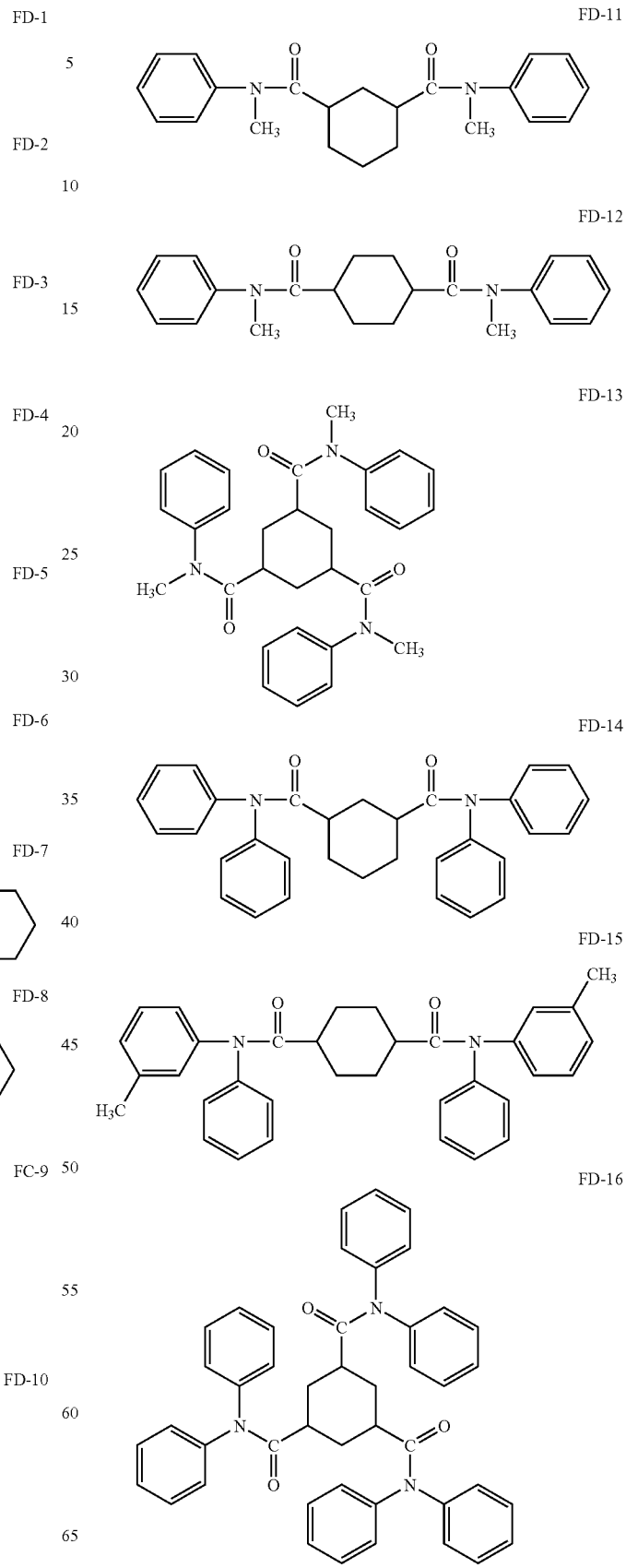
FD-11
FD-12
FD-13
FD-14
FD-15
FD-16

-continued

FD-17
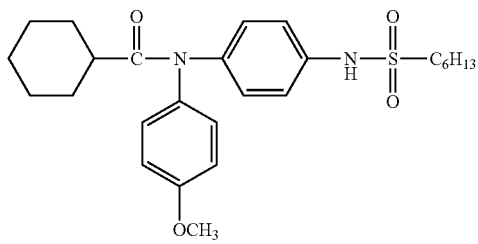

FD-18
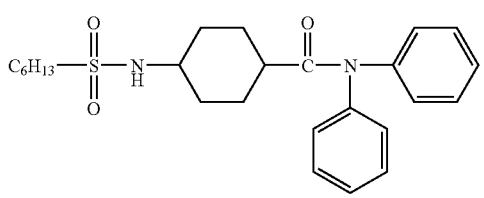

FD-19
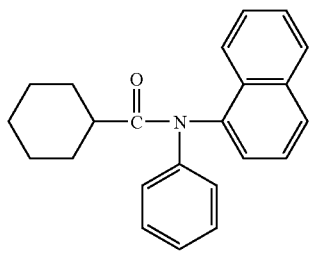

FD-20
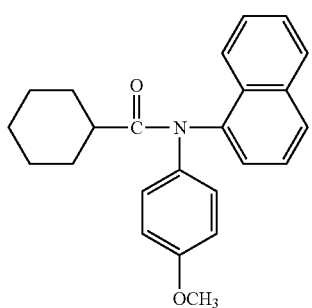

FD-21
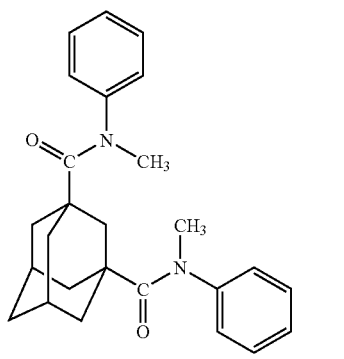

FD-22
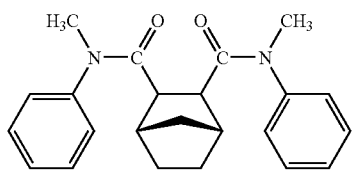

(Chromatic Dispersion Controlling Agent)

A compound lowering the chromatic dispersion of the cellulose acylate films (hereinafter, referred to as a "chromatic dispersion controlling agent") will be described. In order to improve Rth of the chromatic dispersion of cellulose acylate films in the invention, it is desirable in that at least one compound, which lowers the Rth of the chromatic dispersion represented by the following equation (VII) $\Delta Rth=|Rth_{(400)}-Rth_{(700)}|$, be in the range satisfying the following equations (V) and (VI):

$$\Delta Rth=|Rth_{(400)}-Rth_{(700)}| \qquad (IV)$$

$$(\Delta Rth(B)-\Delta Rth(0))/B \leq -2.0 \qquad (V)$$

$$0.01 \leq B \leq 30; \qquad (VI)$$

It is more desirable in that the above equations (V) and (VI) being in the range of:

$$(\Delta Rth(B)-\Delta Rth(0))/B \leq -3.0 \qquad (V-I)$$

$$0.05 \leq B \leq 25; \text{ and} \qquad (VI-I)$$

It is even more desirable in that the above equations (V) and (VI) being in the range of:

$$(\Delta Rth(B)-\Delta Rth(0))/B \leq -4.0 \qquad (V-II)$$

$$0.1 \leq B \leq 20. \qquad (VI-II)$$

The chromatic dispersion controlling agent is absorbed in an ultraviolet region of 200 to 400 nm, and the Re and Rth chromatic dispersion of cellulose acylate films are controlled by containing at least one compound, which lowers $|Re_{(400)}-Re_{(700)}|$ and $|Rth_{(400)}-Rth_{(700)}|$ of the films, in an amount of 0.01 to 30% by mass with respect to the cellulose acylate solid content. The Re and Rth chromatic dispersion of cellulose acylate films are controlled by containing 0.1 to 20% by mass, preferably 0.2 to 10% by mass, as an addition amount.

The cellulose acylate film has a chromatic dispersion property such that the Re and Rth values in general are larger in the longer wavelength than in the shorter wavelength side. Therefore, in order to enlarge the relatively small Re and Rth in the shorter wavelength side, smoothing the chromatic dispersion is requested. Meanwhile, the compound absorbed at an ultraviolet region of 200 to 400 nm has a chromatic dispersion property such that the light absorbance is larger in the longer wavelength than in the shorter wavelength side. When the compound itself exists uniformly inside the cellulose acylate film, it is assumed that the birefringence of the compound, that is, the chromatic dispersion of Re, Rth and light absorbance is large in the shorter wavelength side.

As described above, by using a compound having absorbance at 200 to 400 nm, and the chromatic dispersion of Re and Rth of the compound itself assumed to be large in the shorter wavelength side, it is possible to control the Re, Rth chromatic dispersion of the cellulose acylate film. Therefore, the compound which controls the chromatic dispersion being sufficiently and homogeneously soluble to cellulose acylated is requested. The range of the absorbance in the ultraviolet region of these compounds is preferably 200 to 400 nm, more preferably 220 to 395 nm, and even more preferably 240 to 390 nm.

Recently, in the liquid crystal display devices such as television, laptop computer and mobile cellular phone, the brightness was increase with less electrical power. Therefore, a light element, which is used in the liquid crystal display devices, having excellent transmittance is requested. In this regard, in the case of adding a compound, which has the absorbance at an ultraviolet region of 200 to 400 nm and which lowers $|Re_{(400)}-Re_{(700)}|$ and $|Rth_{(400)}-Rth_{(700)}|$ of films, to cellulose acylate films, a light element having excellent spectral transmittance is requested. According to cellulose acylate films of the invention, the spectral transmittance at a wavelength of 380 nm is 45% to 95%; however, the spectral transmittance at a wavelength of 380 nm being 10% or less is desired.

Accordingly, the chromatic dispersion controlling agent preferably used in the invention having the molecular weight of 250 to 1000 is preferred in the view point of volatility. It is more preferably 260 to 800, even more preferably 270 to 800, and particularly preferably 300 to 800. Within these ranges of molecular weight, the chromatic dispersion controlling agent may be in a form of specific monomer, or in a form of oligomer or polymer formed from multiple bonding of the monomer unit.

It is preferable not to emit the chromatic dispersion controlling agent during dope casting and drying process of the cellulose acylate film preparation.

The chromatic dispersion controlling agent may be used alone or in combination of 2 or more compounds in an arbitrary ratio.

Also, the timing of the chromatic dispersion controlling agent addition may be any time during the dope preparation process or after the completion of the dope preparation process.

Specific examples of the chromatic dispersion controlling agent preferably used in the invention include benzotriazole compounds, benzophenone compounds, cyano group-containing compounds, oxybenzophenone compounds, salicylic acid ester compounds, nickel complex salt compounds or the like. Chromatic dispersion controlling agents which can be used in the present invention are not limited thereto.

Examples of benzotriazole compound represented by Formula (101) can be preferably used as a chromatic dispersion controlling agent of the invention.

$$Q^{11}\text{-}Q^{12}\text{-OH} \qquad \text{Formula (101)}$$

Wherein $Q^{11}$ is a nitrogen-containing aromatic heterocyclic ring, $Q^{12}$ is an aromatic ring.

$Q^{11}$ is a nitrogen-containing aromatic heterocyclic ring, preferably represents a 5- to 7-membered nitrogen-containing aromatic heterocyclic ring, and more preferably represents a 6-membered nitrogen-containing aromatic heterocyclic ring. Examples thereof include imidazole, pyrazole, triazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene, tetrazaindene and the like. More preferably, a 5-membered nitrogen-containing aromatic heterocyclic ring include imidazole, pyrazole, triazole, tetrazole, thiazole, oxazole, benzotriazole, benzothiazole, benzoxazole, thiadiazole, oxadiazole preferably with benzotriazole being particularly preferable.

The nitrogen-containing aromatic heterocyclic ring represented by $Q^{11}$ may be further substituted, and the substituent is preferably the following substituent T. Further, in the case where the nitrogen-containing aromatic heterocyclic ring contains a plurality of substituent, each substituent may be condensed to form a ring structure.

The aromatic ring represented by $Q^{12}$ may be an aromatic hydrocarbon ring or an aromatic heterocyclic ring. Also, the aromatic rings may be monocyclic or may form a fused ring with other rings.

The aromatic hydrocarbon ring is preferably a monocyclic or bicyclic aromatic hydrocarbon ring having 6 to 30 carbon atoms (e.g., a benzene ring, a naphthalene ring, etc.), more preferably a monocyclic or bicyclic aromatic hydrocarbon ring having 6 to 20 carbon atoms, and even more preferably a monocyclic or bicyclic aromatic hydrocarbon ring having 6 to 12 carbon atoms. Particularly preferred is a benzene ring.

The aromatic heterocyclic ring is preferably an aromatic heterocyclic rings containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferable examples of the aromatic heterocyclic ring include pyridine, triazine, and quinoline.

$Q^{12}$ may have a substituent, preferably substituent T as follows. Examples of the substituent T include an alkyl group (preferably having 1 to 20 carbon atoms, more preferably 1 to 12 carbon atoms, and particularly preferably 1 to 8 carbon atoms; e.g., methyl, ethyl, isopropyl, tert-butyl, octyl, decyl, hexadecyl, cyclopropyl, cyclopenyl, cyclohexyl, etc.), an alkenyl group (preferably having 2 to 20 carbon atoms, more preferably 2 to 12 carbon atoms, and particularly preferably 2 to 8 carbon atoms; e.g., vinyl, allyl, 2-butenyl, 3-pentenyl, etc.), an alkynyl group (preferably having 2 to 20 carbon atoms, more preferably 2 to 12 carbon atoms, and particularly preferably 2 to 8 carbon atoms; e.g., propargyl, 3-pentynyl, etc.), an aryl group (preferably having 6 to 30 carbon atoms, more preferably 6 to 20 carbon atoms, and particularly preferably 6 to 12 carbon atoms; e.g., phenyl, p-methylphenyl, naphthyl, etc.), a substituted or unsubstituted amino group (preferably having 0 to 20 carbon atoms, more preferably 0 to 10 carbon atoms, and particularly preferably 0 to 6 carbon atoms; e.g., amino, methylamino, dimethylamino, diethylamino, dibenzylamino, etc.), an alkoxy group (preferably having 1 to 20 carbon atoms, more preferably 1 to 12 carbon atoms, and particularly 1 to 8 carbon atoms; e.g., methoxy, ethoxy, butoxy, etc.), an aryloxy group (preferably having 6 to 20 carbon atoms, more preferably 6 to 16 carbon atoms, and particularly preferably 6 to 12 carbon atoms; e.g., phenyloxy, 2-naphthyloxy, etc.), an acyl group (preferably having 1 to 20 carbon atoms, more preferably 1 to 16 carbon atoms, and particularly preferably 1 to 12 carbon atoms; e.g., acetyl, benzoyl, formyl, pivaloyl, etc.), an alkoxycarbonyl group (preferably having 2 to 20 carbon atoms, more preferably 2 to 16 carbon atoms, and particularly preferably 2 to 12 carbon atoms; e.g., methoxycarbonyl, ethoxycarbonyl, etc.), an aryloxycarbonyl group (preferably having 7 to 20 carbon atoms, more preferably 7 to 16 carbon atoms, and particularly preferably 7 to 10 carbon atoms; e.g., phenyloxycarbonyl, etc.), an acyloxy group (preferably having 2 to 20 carbon atoms, more preferably 2 to 16 carbon atoms, and particularly preferably 2 to 10 carbon atoms; e.g., acetoxy, benzoyloxy, etc.), an acylamino group (preferably having 2 to 20 carbon atoms, more preferably 2 to 16 carbon atoms, and particularly preferably 2 to 10 carbon atoms; e.g., acetylamino, benzoylamino, etc.), an alkoxycarbonylamino group (preferably having 2 to 20 carbon atoms, more preferably 2 to 16 carbon atoms, and particularly preferably 2 to 12 carbon atoms; e.g., methoxycarbonylamino, etc.), an aryloxycarbonylamino group (preferably having 7 to 20 carbon atoms, more preferably 7 to 16 carbon atoms, and particularly preferably 7 to 12 carbon atoms; e.g., phenyloxycarbonylamino, etc.), a sulfonylamino group (preferably having 1 to 20 carbon atom, more preferably 1 to 16 carbon atoms, and particularly preferably 1 to 12 carbon atoms; e.g., methanesulfonylamino, benzenesulfonylamino, etc.), a sulfamoyl group (preferably having 0 to 20 carbon atoms, more preferably 0 to 16 carbon atoms, and particularly preferably having 0 to 12 carbon atoms; e.g., sulfamoyl, methylsulfamoyl, dimethylsulfamoyl, phenylsulfamoyl, etc.), a carbamoyl group (preferably having 1 to 20 carbon atoms, more preferably 1 to 16 carbon atoms, and particularly preferably 1 to 12 carbon atoms; e.g., carbamoyl, methylcarbamoyl, diethylcarbamoyl, phenylcarbamoyl, etc.), an alkylthio group (preferably having 1 to 20 carbon atoms, more preferably 1 to 16 carbon atoms, and particularly preferably 1 to 12 carbon atoms; e.g., methylthio, ethylthio, etc.), an arylthio group (preferably having 6 to 20 carbon atoms, more preferably 6 to 16 carbon atoms, and particularly preferably 6 to 12 carbon atoms; e.g., phenylthio, etc.), a sulfonyl group (preferably having 1 to 20 carbon atoms, more preferably 1 to 16 carbon atoms, and particularly preferably 1 to 12 carbon atoms; e.g., mesyl, tosyl, etc.), a sulfinyl group (preferably having 1 to 20 carbon atoms, more preferably 1 to 16 carbon atoms, and particularly preferably 1 to 12 carbon atoms; e.g., methanesulfinyl, benzenesulfinyl, etc.), an ureido group (preferably having 1 to 20 carbon atoms, more preferably 1 to 16 carbon atoms, and particularly preferably 1 to 12 carbon atoms; e.g., ureido, methylureido, phenylureido, etc.), a phosphoric acid amide group (preferably having 1 to 20 carbon atoms, more preferably 1 to 16 carbon atoms, and particularly preferably 1 to 12 carbon atoms; e.g., diethylphosphoric acid amide, phenylphosphoric acid amide, etc.), a hydroxyl group, a mercapto group, a halogen atom (e.g., a fluorine atom, a chloride atom, a bromine atom and an iodine atom), a cyano group, a sulfo group, a carboxyl group, a nitro group, a hydroxamic acid group, a sulfino group, a hydrazino group, an imino group, a heterocyclic group (preferably having 1 to 30 carbon atoms, more preferably 1 to 12 carbon atoms, and having a heteroatom such as a nitrogen atom, an oxygen atom, or a sulfur atom; e.g., imidazolyl, pyridyl, quinolyl, furyl, piperidyl, morpholino, benzoxazolyl, benzimidazolyl, benzothiazolyl, etc.), a silyl group (preferably having 3 to 40 carbon atoms, more preferably 3 to 30 carbon atoms, and particularly preferably 3 to 24 carbon atoms; e.g., trimethylsilyl, triphenylsilyl, etc.), and the like. These substituents may be further substituted. When there are two or more substituents, they may be identical or different. If possible, they may be bonded to each other to form a ring.

The compound represented by Formula (101) is preferably a compound represented by the following formula (101-A):

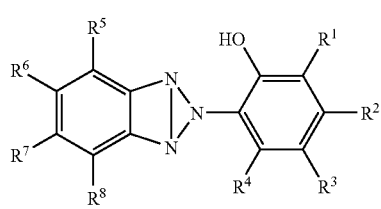

Formula (101-A)

wherein $R^1$, $R^2$, $R^3$, $R^4$, $R^5$, $R^6$, $R^7$ and $R^8$ are each independently a hydrogen or a substituent.

$R^1$, $R^2$, $R^3$, $R^4$, $R^5$, $R^6$, $R^7$ and $R^8$ each independently represent a hydrogen atom or a substituent, and the substituent may be exemplified by the above-described substituent T. These substituents may be further substituted with other substituents, and the substituents may be condensed to form a ring structure.

$R^1$ and $R^3$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; and particularly preferably an alkyl group having 1 to 12 carbon atoms (preferably having 4 to 12 carbon atoms).

$R^2$ and $R^4$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^5$ and $R^8$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom, an alkyl group having 1 to 12 carbon atoms; particularly preferably a hydrogen atom or a methyl group; and most preferably a hydrogen atom.

$R^6$ and $R^7$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group, a halogen atom; still more preferably a hydrogen atom or a halogen atom; and particularly preferably a hydrogen atom or a chlorine atom.

The compound represented by Formula (101) is preferably a compound represented by the following formula (101-B):

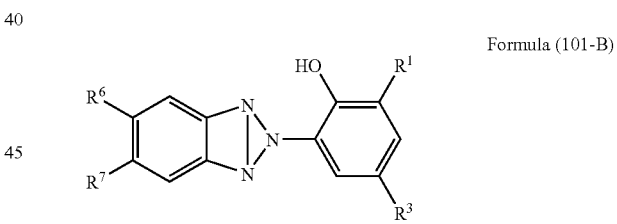

Formula (101-B)

wherein $R^1$, $R^3$, $R^6$ and $R^7$ have the same as meaning as those in Formula (101-A), and their preferable ranges are the same as those in Formula (101-A).

Specific examples of the compound represented by Formula (101) will be given in the following. Compounds used in the present invention are not limited thereto.

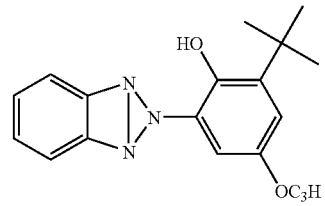

UV-1

-continued
UV-2
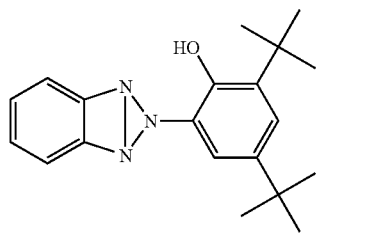
UV-3
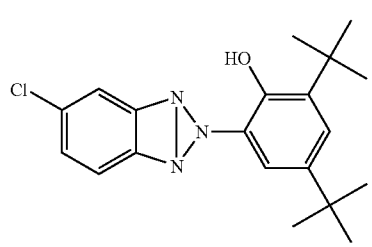
UV-4
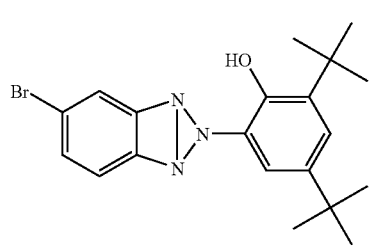
UV-5
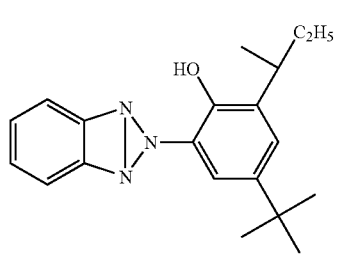
UV-6
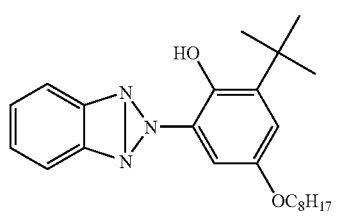
UV-7
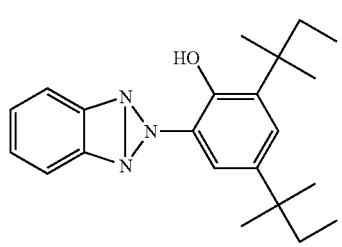
-continued
UV-8
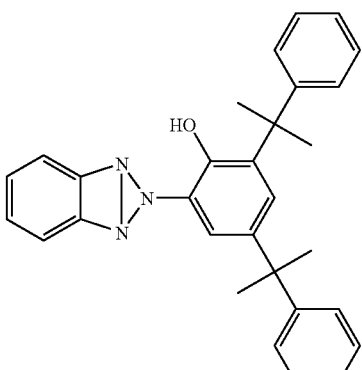
UV-9
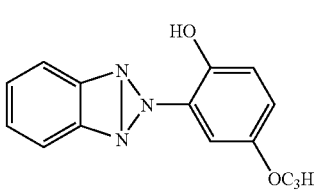
UV-10
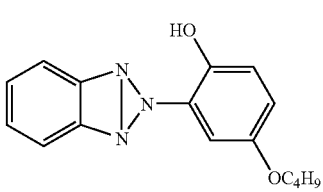
UV-11
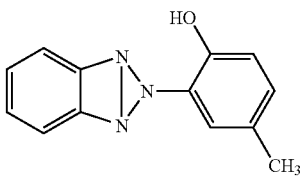
UV-12
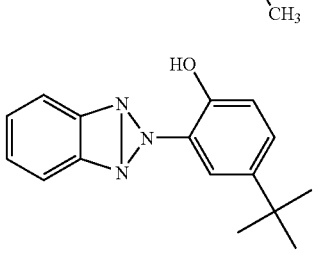
UV-13
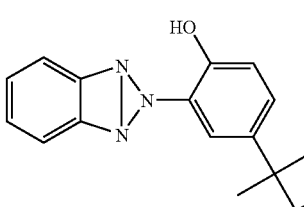
UV-14
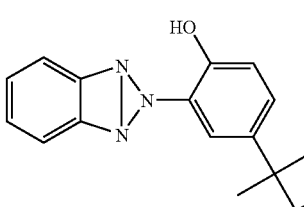

-continued

UV-15
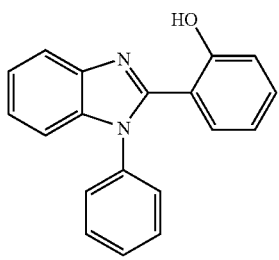

UV-16
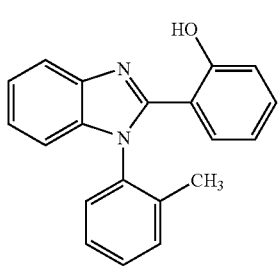

UV-17
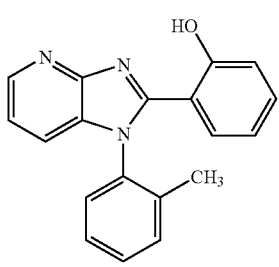

UV-18
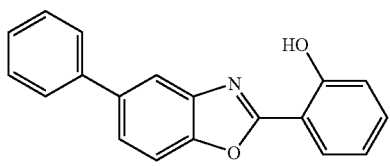

UV-19
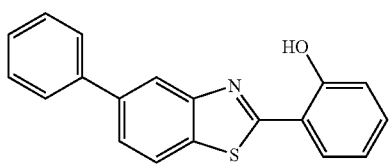

UV-20
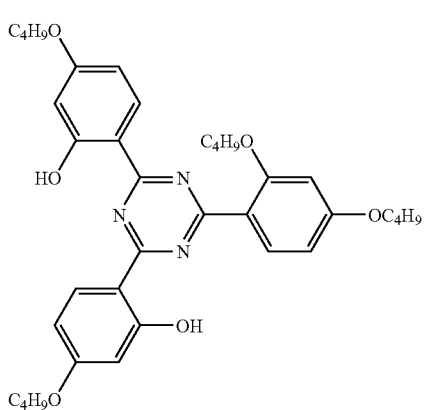

-continued

UV-21
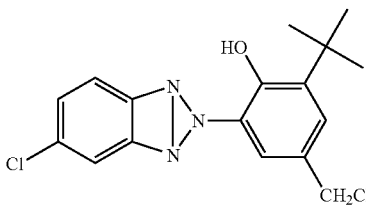

UV-22
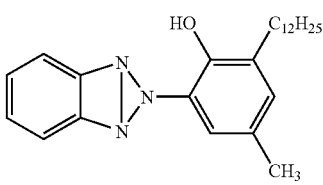

UV-23
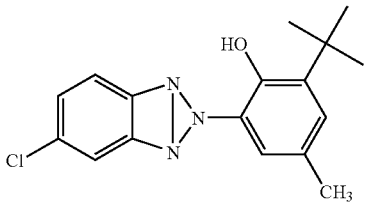

Among the benzotriazole compounds given in the above examples, the compounds excluding those having a molecular weight of 320 or less were confirmed to be advantageous in the aspect of retentivity when produced into cellulose acylate films of the invention.

As another chromatic dispersion controlling agent of the invention, the benzophenone compound represented by Formula (102) is preferably used:

Formula (102)
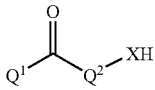

wherein $Q^1$ and $Q^2$ are each independently an aromatic ring, and X is NR (wherein R is a hydrogen atom or a substituent), an oxygen atom or a sulfur atom.

The aromatic ring represented by $Q^1$ and $Q^2$ may be an aromatic hydrocarbon ring or an aromatic heterocyclic ring. These substituents may be monocyclic or may form a fused ring with other rings.

The aromatic hydrocarbon ring represented by $Q^1$ and $Q^2$ is preferably a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring represented by $Q^1$ and $Q^2$ is preferably an aromatic heterocyclic rings containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline.

The aromatic ring represented by $Q^1$ and $Q^2$ is preferably an aromatic hydrocarbon ring, more preferably an aromatic hydrocarbon ring having 6 to 10 carbon atoms, and even more preferably a substituted or unsubstituted benzene ring.

$Q^1$ and $Q^2$ may be further substituted, and the substituent is preferably the following substituent T. However, the substituent does not include carboxylic acids, sulfonic acids or quaternary ammonium salts. If possible, the substituents may be bonded to each other to form a ring structure.

X is NR (where R is a hydrogen atom or a substituent, and the substituent may be exemplified by the following substituent T), an oxygen atom or a sulfur atom. X is preferably NR (wherein R is preferably an acyl group or a sulfonyl group, and these substituents may be further substituted) or O, and particularly preferably O.

The compound represented by Formula (102) is preferably a compound represented by the following Formula (102-A):

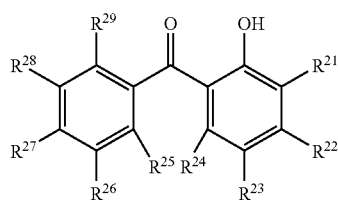

Formula (102-A)

wherein $R^{21}$, $R^{22}$, $R^{23}$, $R^{24}$, $R^{25}$, $R^{26}$, $R^{27}$, $R^{28}$ and $R^{29}$ re each independently a hydrogen atom or a substituent.

$R^{21}$, $R^{23}$, $R^{24}$, $R^{25}$, $R^{26}$, $R^{28}$ and $R^{29}$ each independently represent a hydrogen atom or a substituent, and the substituent may be exemplified by the above-described substituent T. These substituents may be further substituted with other substituents, and the substituents may be condensed to form a ring structure.

$R^{21}$, $R^{23}$, $R^{24}$, $R^{25}$, $R^{26}$, $R^{28}$ and $R^{29}$ are each preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^{22}$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

$R^{27}$ is preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by Formula (102) is more preferably a compound represented by the following Formula (102-B):

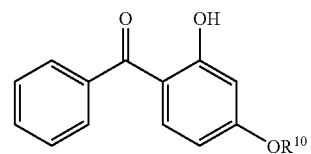

Formula (102-B)

wherein $R^{10}$ is a hydrogen atom, an alkyl group, an alkenyl group, an alkynyl group, or an aryl group.

$R^{10}$ is a hydrogen atom, an alkyl group, an alkenyl group, an alkynyl group, or an aryl group, and the substituents on the aforementioned groups can be exemplified by the substituent T.

$R^{10}$ is preferably an alkyl group, more preferably an alkyl group having 5 to 20 carbon atoms, even more preferably an alkyl group having 5 to 12 carbon atoms (e.g., a hexyl group, a 2-ethylhexyl group, an octyl group, a decyl group, a dodecyl group, a benzyl group, etc.), and particularly preferably a substituted or unsubstituted alkyl group having 6 to 12 carbon atoms (e.g., a 2-ethylhexyl group, an octyl group, a decyl group, a dodecyl group or a benzyl group).

The compound represented by Formula (102) can be synthesized by a known method described in JP-A No. 11-12219.

Specific examples of the compound represented by Formula (102) are given below.

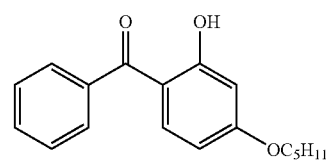

UV-101

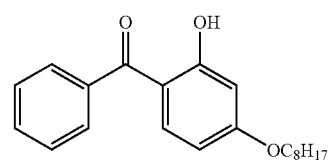

UV-102

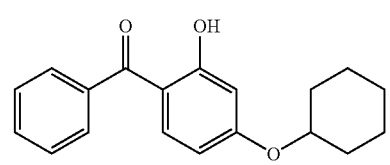

UV-103

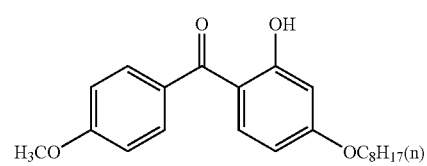

UV-104

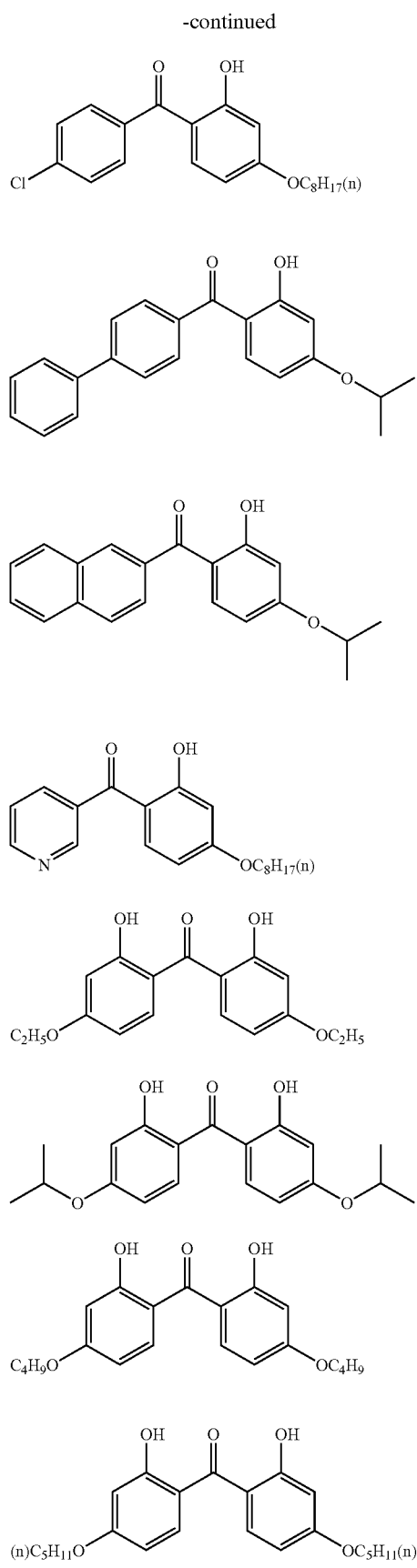

-continued

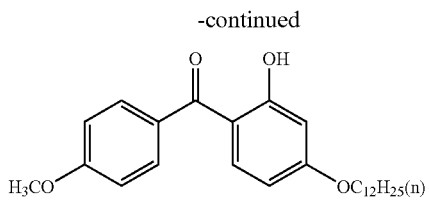

UV-121

As another chromatic dispersion controlling agent used in the invention, a cyano group-containing compound represented by Formula (103) is preferably used:

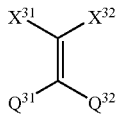

Formula (103)

wherein $Q^{31}$ and $Q^{32}$ are each independently an aromatic ring. $X^{31}$ and $X^{32}$ are each a hydrogen atom or a substituent, and at least one of them is a cyano group, a carbonyl group, a sulfonyl group or an aromatic heterocyclic ring. The aromatic ring indicated as $Q^{31}$ and $Q^{32}$ may be an aromatic hydrocarbon ring or an aromatic heterocyclic ring. Further, these may be monocyclic or may for a fused ring with other rings.

The aromatic hydrocarbon ring is preferably a monocyclic or bicyclic aromatic hydrocarbon ring having 6 to 30 carbon atoms (e.g., benzene ring, naphthalene ring, etc.), more preferably an aromatic hydrocarbon ring having 6 to 20 carbon atoms, even more preferably an aromatic hydrocarbon ring having 6 to 12 carbon atoms, and particularly preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably pyridine, triazine or quinoline.

The aromatic ring indicated as $Q^{31}$ and $Q^{32}$ is preferably an aromatic hydrocarbon ring, and more preferably a benzene ring.

$Q^{31}$ and $Q^{32}$ may be further substituted, and the substituent T above is preferably used.

$X^{31}$ and $X^{32}$ are a hydrogen atom or a substituent and at least one group is a cyano group, a carbonyl group, a sulfonyl group, an aromatic heterocyclic ring. A substituent represented by $X^{31}$ and $X^{32}$ may be exemplified by the above-mentioned substituent T. In addition, the substituent represented by $X^{31}$ and $X^{32}$ may be further substituted by other substituents and each substituent represented by $X^{31}$ and $X^{32}$ may be annelated to form a ring structure.

$X^{31}$ and $X^{32}$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is preferably a compound represented by the following Formula (103-A):

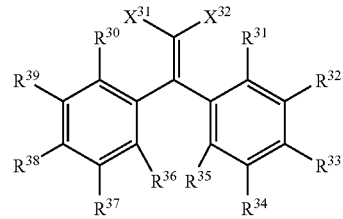

Formula (103-A)

wherein $R^{30}$, $R^{31}$, $R^{32}$, $R^{33}$, $R^{34}$, $R^{35}$, $R^{36}$, $R^{37}$, $R^{38}$, and $R^{39}$ are each independently a hydrogen atom or a substituent. $X^{31}$ and $X^{32}$ have the same meanings as those in Formula (103) and their preferable ranges are the same as those in Formula (103).

$R^{30}$, $R^{31}$, $R^{32}$, $R^{33}$, $R^{34}$, $R^{35}$, $R^{36}$, $R^{37}$, $R^{38}$, and $R^{39}$ each independently represent a hydrogen atom or a substituent, and the substituent may be exemplified by the above-described substituent T. These substituents may be further substituted with other substituents, and the substituents may be annelated to form a ring structure.

$R^{30}$, $R^{31}$, $R^{32}$, $R^{33}$, $R^{34}$, $R^{35}$, $R^{36}$, $R^{37}$, $R^{38}$, and $R^{39}$ are each preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^{33}$ and $R^{38}$ are each preferably a hydrogen atom, an alkyl group, an alkenyl group, an alkynyl group, an aryl group, an amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by Formula (103) is more preferably a compound represented by the following Formula (103-B):

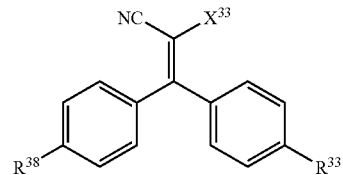

Formula (103-B)

wherein $R^{33}$ and $R^{38}$ have the same meanings as those in Formula (103-A) and their preferable ranges are the same as those in Formula (103-A). $X^{33}$ represents a hydrogen atom or a substituent.

$X^{33}$ represents a hydrogen atom or a substituent, and the substituent may be exemplified by the above-described substituent T. The substituent may be further substituted with other substituents, if possible. $X^{33}$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR$^{301}$ (R$^{301}$ is an alkyl group having 1 to 20 carbon atoms, an aryl group having 6 to 12 carbon atoms, and a combination thereof).

The compound represented by Formula (103) is more preferably a compound represented by the following Formula (103-C):

Formula (103-C)

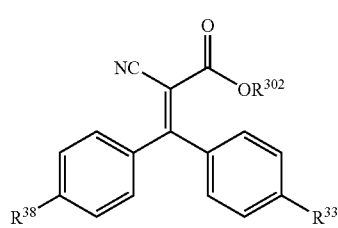

wherein $R^{33}$ and $R^{38}$ have the same meanings as those in Formula (103-A) and their preferable ranges are the same as those in Formula (103-A). $R^{302}$ represents an alkyl group having 1 to 20 carbon atoms.

When both of $R^{33}$ and $R^{38}$ are a hydrogen atom, $R^{302}$ is preferably an alkyl group having 2 to 12 carbon atoms, more preferably an alkyl group having 4 to 12 carbon atoms, even more preferably an alkyl group having 6 to 12 carbon atoms, particularly preferably an octyl group, a tert-octyl group, a 2-ethylhexyl group, a decyl group, or a dodecyl group, and most preferably 2-ethylhexyl group.

When $R^{33}$ and $R^{38}$ are not a hydrogen atom, the compound represented by the Formula (103-C) has a molecular weight of 300 or more and $R^{21}$ is preferably an alkyl group having 20 or less carbon atoms The compound represented by Formula (103) of the invention can be synthesized by a method described in Journal of American Chemical Society, Vol. 63, pp. 3452 (1941).

Specific examples of the compound represented by Formula (103) are given below. Compounds which can be used in the present invention are not limited thereto.

UV-201

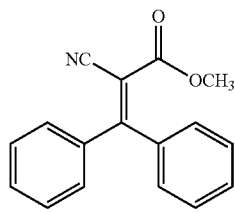

UV-202

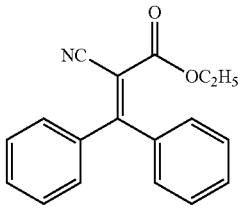

UV-203

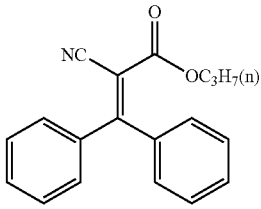

UV-204

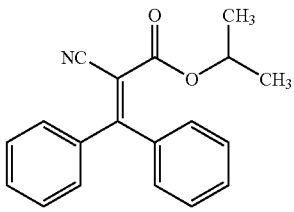

UV-205

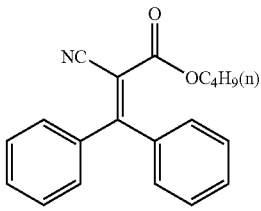

UV-206

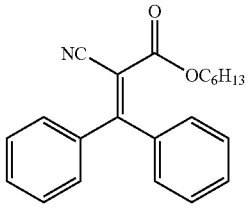

UV-207

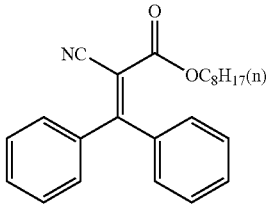

UV-208

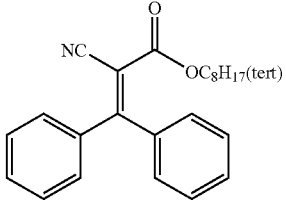

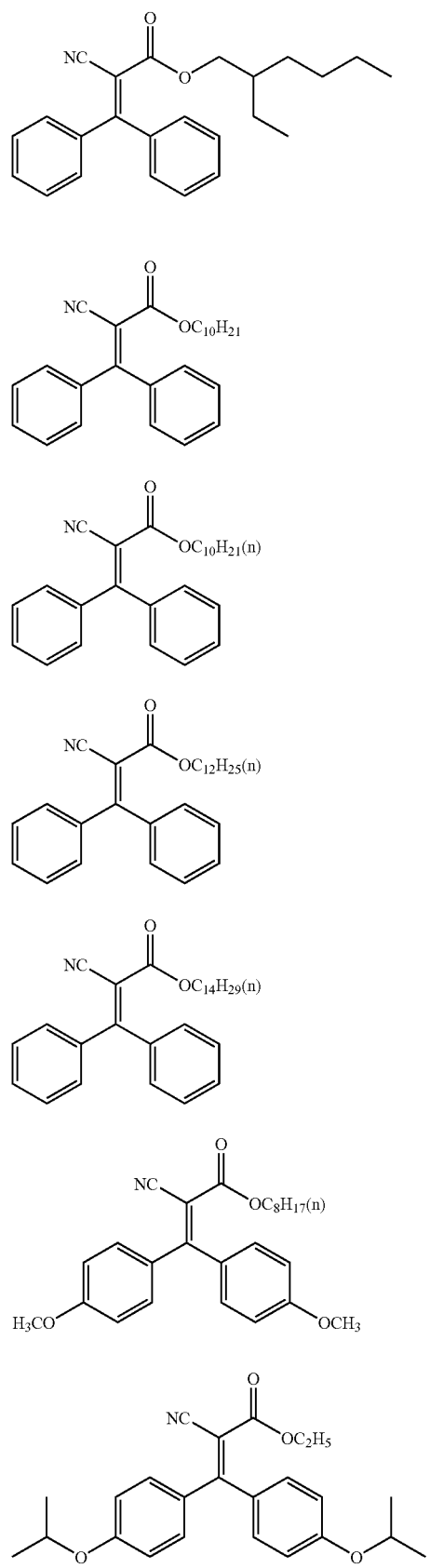
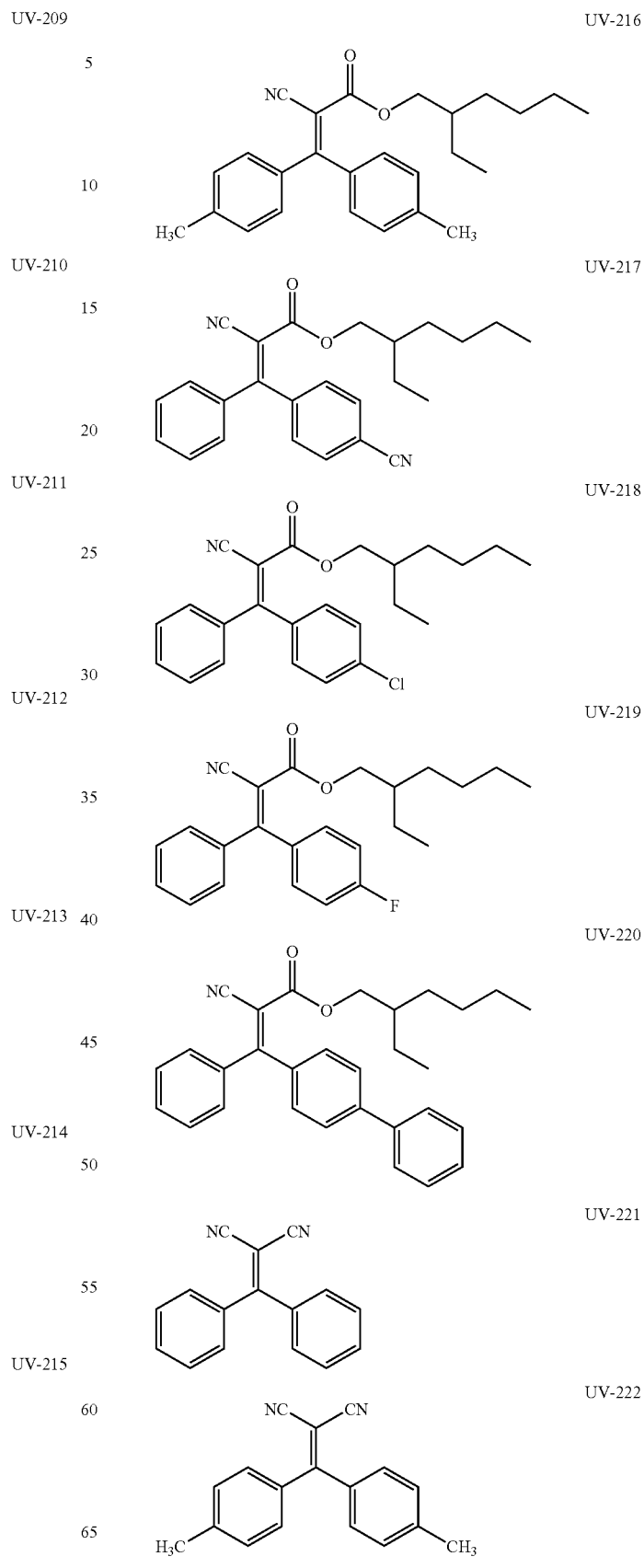

-continued

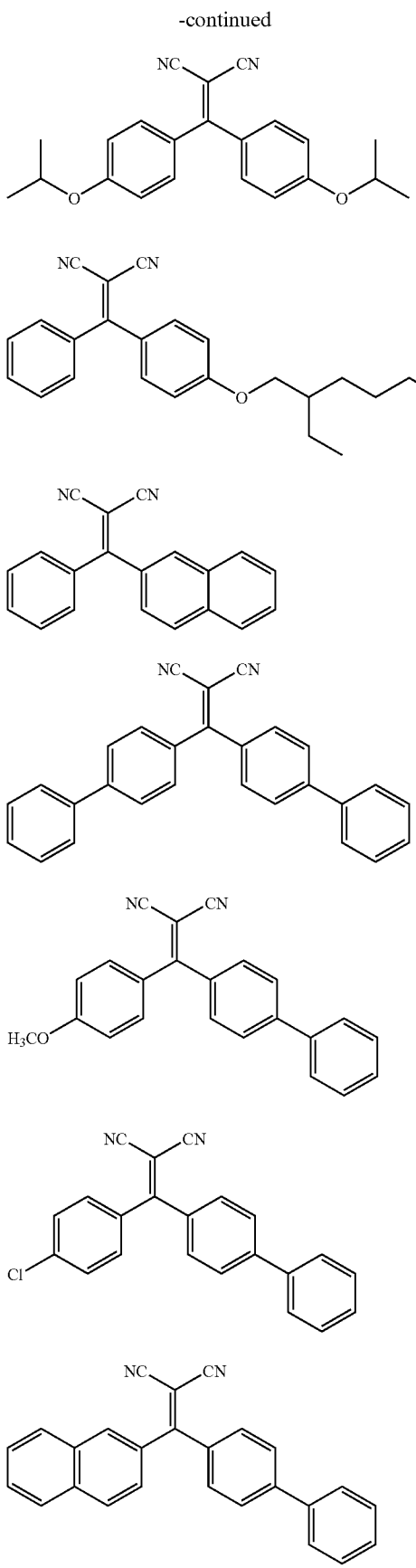

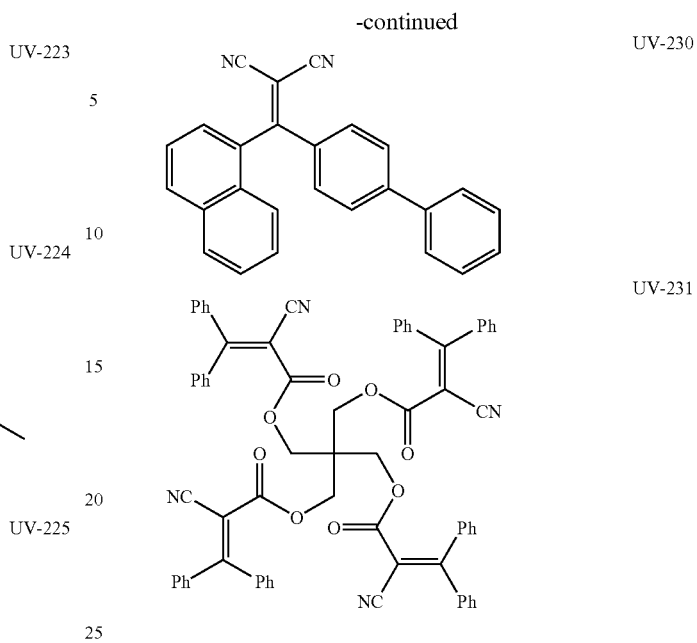

(Fine Particles of Matting Agent)

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferred because of having a low turbidity. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the resultant film can be lowered thereby. The apparent specific gravity is preferably form 90 to 200 g/l or more and more preferably from 100 to 200 g/l or more. A higher apparent specific gravity makes it possible to prepare a dispersion having the higher concentration, thereby improving haze and aggregates.

These fine particles form the secondary particles having an average particle size of usually from 0.1 to 3.0 μm. In a film, these fine particles occur as aggregates of the primary particles and provide irregularities of 0.1 to 3.0 μm on the film surface. It is preferred that the average secondary particle size is from 0.2 μm to 1.5 μm, more preferably from 0.4 μm to 1.2 μm and most preferably from 0.6 μm to 1.1 μm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, R202, OX50 and TT600 (each manufactured by Dehussa Japan Co., Ltd.). As the fine particles of zirconium oxide, use can be made of products marketed under the trade name of, for example, AEROSIL R976 and R811 (each manufactured by Dehussa Japan Co., Ltd.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the turbidity of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by weight, preferably from 10 to 25% by weight and most preferably from 15 to 20% by weight. A higher dispersion concentration is preferred, since the solution turbidity in response to the amount added is lowered and haze and aggregation are improved thereby. The final content of the cellulose acylate in the dope solution preferably ranges from 0.01 to 1.0 g/m$^2$, more preferably from 0.03 to 0.3 g/m$^2$ and most preferably from 0.08 to 0.16 g/m$^2$.

Preferable examples of lower alcohols usable as the solvent include methyl alcohol, ethyl alcohol, propyl alcohol, isopropyl alcohol and butyl alcohol. Solvents other than lower alcohols are not particularly restricted, it is preferable to use solvents which have been used in forming cellulose ester films. Examples thereof include a solvent selected from a halogenated hydrocarbon with 1 to 7 carbon atoms.

(Plasticizer, Anti-Deterioration Agent, Releasing Agent)

The cellulose acylate film of the invention may include, in addition to the compound for reducing Rth and the wavelength dispersion regulating agent mentioned above, various additives (such as a plasticizer, an anti-ultraviolet agent, an anti-deterioration agent, a releasing agent, and an infrared absorber), which may be added in the preparation steps according to the purpose and which may be a solid or an oily substance. Melting point and boiling point are not particularly restricted. For example, a mixing of an ultraviolet absorbing material at 20°° C. or lower or at 20° C. or higher, and a mixing of a plasticizer are possible as described in JP-A No. 2001-151901. Also an infrared absorbing dye is described for example in JP-A No. 2001-194522. Also the addition may be executed any time in the process of preparation of a dope solution, or by adding an additive adding step in a final preparation step of such process. The amount of each additive is not particularly restricted so long as the additive functions. Also in the case where the cellulose acylate film is formed of plural layers, the kind and the amount of the additive may be different in each layer. These are known technologies as described for example in JP-A No. 2001-151902. For such technologies, there are preferably used materials described in detail in Japan Institute of Invention and Innovation, Journal of Technical Disclosure (Technical Publication No. 2001-1745, pp. 16-22, Mar. 15, 2001, published by Japan Institute of Invention and Innovation).

[Ratio of Addition of Compounds]

In the cellulose acylate film of the invention, the total amount of compounds having a molecular weight of 3,000 or less is preferably 5 to 45%, more preferably 10 to 40% and even more preferably 15 to 30% with respect to the weight of cellulose acylate. Such compounds include a compound for reducing Rth, a wavelength dispersion regulating agent, an anti-ultraviolet agent, a plasticizer, an anti-deterioration agent, fine particles, a releasing agent, an infrared absorber and the like as described above, and have a molecular weight of preferably 3,000 or less, more preferably 2,000 or less and even more preferably 1,000 or less. In the case where the total amount of these compounds is 5% or less, properties of the cellulose acylate alone tend to be exhibited, thereby resulting in fluctuations in optical performances and physical strength in response to changes in temperature and humidity. Further, the total amount of these compounds above 45% may exceeds a limit of solubility of these compounds in the cellulose acylate film, thus causing a precipitation on the film surface and leading to a white turbidity of the film (bleeding from the film).

(Organic Solvent for Cellulose Acylate Solution)

In the invention, the cellulose acylate film is preferably produced by a solvent cast method, utilizing a solution (dope) prepared by dissolving cellulose acylate in an organic solvent. A principal solvent to be used in the invention is preferably selected from an ester, a ketone, and an ether having 3 to 12 carbon atoms, and a halogenated hydrocarbon having 1 to 7 carbon atoms. The ester, ketone or ether may have a ring structure. A compound having two or more functional groups of ester, ketone or ether (namely —O—, —CO— or —COO—) can also be used as a principal solvent, and another functional group such as an alcoholic hydroxyl group may be present. In a principal solvent having two or more functional groups, the number of carbon atoms of such solvent may maintained within a range defined for a compound having either of such functional groups.

For the cellulose acylate film of the invention, a halogenated hydrocarbon of chlorine type may be used as the principal solvent, or a non-chlorine solvent may be used as the principal solvent as described in Japan Institute of Invention and Innovation, Journal of Technical Disclosure, Technical Publication No. 2001-1745, pp. 12-16. Either can be used to cellulose acylate films used in the present invention.

A solvent for the cellulose acylate solution and film of the invention, including a dissolving method, is described, as preferred embodiments, in following Patent Documents: JP-A Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988 and 11-60752. These Patent Documents describe not only a solvent preferable for the cellulose acylate of the invention but also properties of a solution thereof and substances to be present, and constitute preferable embodiments also in the present invention.

[Manufacturing Process of Cellulose Acylate Film]

(Dissolving Process)

A solution (dope) of the cellulose acylate of the invention is not restricted in a method of dissolution, and may be prepared at a room temperature, or by a cooled dissolving method or a high-temperature dissolving method, or a combination thereof. For a process of preparation of a cellulose acylate solution of the invention, and processes of concentration and filtration of the solution associated with the dissolving process, there can be preferably used a manufacturing process described in detail in Japan Institute of Invention and Innovation, Journal of Technical Disclosure (Technical Publication No. 2001-1745, pp. 22-25, Mar. 15, 2001, published by Japan Institute of Invention and Innovation).

(Transparency of Dope Solution)

The cellulose acylate solution preferably has a dope transparency of preferably 85% or higher, more preferably 88% or higher and more preferably 90% or higher. It was confirmed that various additives are sufficiently dissolved in the cellulose acylate solution (dope) of the invention. For the specific calculation method of dope transparency, the dope solution is filled in glass cell of 1 cm square and absorbance at 550 nm is measured using the spectrophotometer (UV-3150, manufactured by Shimadzu Corporation). The absorbance of the solvent is previously measured as the blank, and the transparency of cellulose acylate is calculated from a ratio to the absorbance of the blank.

(Casting, Drying and Winding Process)

Next, the process of producing a film using the cellulose acylate solution of the invention is described below. The cellulose acylate film of the invention can be produced by the method and apparatus conventionally used for preparation of the cellulose triacetate films according to the solution casting method and solution casting apparatus. For example, the dope (cellulose acylate solution) prepared in a dissolving tank (pot) is stored into a stock tank, defoamed and finally prepared. Then, the dope is sent from outlet to a pressurized die through a quantitative gear pump of pressing type, which can quantitatively send the dope with high precision, for example, according to rotation number, and from a metal fittings of the pressurized die (slit), the dope is evenly cast on a metal support of casting part running endlessly. At the peeling point where the metal support nearly once rotates, the insufficiently dried dope film (which is referred to as web) is peeled from the metal support. While both sides of the web are fixed with clips to keep the width, the web is transferred and dried with a tenter, then the web is successively transferred with rollers of drying apparatus to complete drying, and wound up by a winder in a predetermined length. The combination of the tenter and the rollers of drying apparatus can be varied according to the purpose. A coating apparatus is often used to the cellulose acylate film of the present invention for the purpose of surface processing of polarization film. This is described in detail in the Laid-open Technical Report, pp. 25 to 30 (No. 2001-1745, Mar. 15, 2001, Japan Institute of Invention and Innovation), and classified as casting (including co-cast), metal support, drying and peeling, which is preferably used in the invention.

The thickness of the cellulose acylate film is preferably in the range of 10 to 120 μm, more preferably 20 to 100 μm, and more preferably 30 to 90 μm.

[Changes of Optical Property of Film After High Humidity Processing]

(Evaluation of Physical Properties for Cellulose Acylate Film)

Regarding the change in the optical properties according to the environmental change of the cellulose acylate film of the invention, it is preferable that the variation of Re and Rth of the film processed at 60° C. and 90% RH for 240 hours is 15 nm or less, more preferably 12 nm or less and more preferably 10 nm or less.

(Change in Optical Property of Film After High Temperature Processing)

More over, it is preferable that the variation of Re and Rth of the film processed at 80° C. for 240 hours is 15 nm or less, more preferably 12 nm or less, and more preferably 10 nm or less.

(Amount of Volatilized Compound After Heating Process of Film)

For the compound for lowering Rth and the compound for decreasing ΔRth, which can be preferably used in cellulose acylate film of the invention, it is preferable that the amount of the compound volatilized from the film, which is processed at 80° C. for 240 hours is 30% or below, more preferably 25% or below, and more preferably 20% or below.

Further, the amount of the compound volatilized from the film is evaluated as followings. The film treated at 80° C. for 240 hours and the untreated film were dissolved in a solvent, respectively and the compounds were detected by high performance liquid chromatography. The amount of the residual compounds in the film is calculated as peak areas of the compounds by the following equation.

Volatilization ratio (%)={(amount of residual compounds in untreated products)−(amount of residual compounds in treated products)/(amount of residual compounds in untreated products)×100

(Glass Transition Temperature Tg of Film)

The glass transition temperature Tg of the cellulose acylate film of the invention is 80 to 165° C. From the viewpoint of heat resistance, Tg is preferably 100 to 160° C., and more preferably 110 to 150° C. The glass transition temperature Tg is measured using a 10 mg sample of the cellulose acylate film of the invention by differential scanning calorimeter (DSC2910, manufactured by T.A Instrument) from room temperature to 200° C. at a rate of the temperature rising and falling of 5° C./min.

(Haze of Film)

The haze of the cellulose acylate film of the invention is preferably 0.01 to 2.0%, more preferably 0.05 to 1.5%, and particularly preferably 0.1 to 1.0%. The transparency of the film as an optical film is important. The haze is measured using a sample of the cellulose acylate film of the invention cut into the size of 40 mm×80 mm by hazemeter (HGM-2DP, manufactured by Suga test instruments Co., Ltd.) under the condition of 25° C. and 60% RH according to JIS K-6714.

(Humidity Dependency of Re and Rth of Film)

The in-plane retardation Re and the retardation Rth in the thickness direction of the cellulose acylate film of the invention are preferably those which have a minor change due to the humidity. Specifically, the difference between the Rth value as measured under the condition of 25° C. and 10% RH and the Rth value as measured under the condition of 25° C. and 80%, namely ΔRth (=Rth 10% RH−Rth 80% RH) is preferably in the range of 0 to 50 nm, more preferably 0 to 40 nm, and more preferably 0 to 35 nm.

(Equilibrium Water Content of Film)

The equilibrium water content of the cellulose acylate film of the invention is preferably 0 to 4% under the condition of 25° C. and 80%, more preferably 0.1 to 3.5%, and particularly preferably 1 to 3%, regardless of film thickness, not to undermine the adherence to the water-soluble polymer such as polyvinylalcohol. 4% or more of equilibrium water content is not preferable because the dependency on humidity variation of retardation is too high, when used as a support of optically compensatory film. Less than 4% of equilibrium water content is preferable since humidity dependency of retardation can be minimized. The water content is measured using a sample of the cellulose acylate film of the invention cut into the size of 7 mm×35 mm by moisture meter and sample drying apparatus (CA-03, VA-05, manufactured by Mitsubishi Chemical Corporation) according to the Karl Fisher's method, to divide the amount of water (g) by the mass of the sample (g).

(Moisture Permeability)

The moisture permeability of the cellulose acylate film using as an optically compensatory film of the invention is measured according to the JIS Z-0208 under the condition of 60° C. and 95% RH. The moisture permeability is preferably in the range of 400 to 2000 g/m$^2$·24 h, reduced in terms of film thickness of 80 μm, more preferably 500 to 1800 g/m$^2$·24 h and particularly preferably 600 to 1600 g/m$^2$·24 h. When the value is 2000 g/m$^2$·24 h or less, the absolute value of humidity dependency of Re value and Rh value of the film can be maintained in 5 nm/% RH or less more easily. When the optically compensatory sheet or the polarizer is incorporated in liquid crystal display apparatus, variation of hue or deterioration of viewing angle is suppressed more effectively. Also, in the case where the polarizer is prepared to adhere on both sides of the polarizing film, when the moisture permeability is 400 g/m$^2$·24 h or more, the adhesive on the cellulose acylate film can be dried more easily to enable a good adhesion.

When the cellulose acylated film is too thick, the moisture permeability is lowered, while the thin film increases the water permeability. Thus, any film thickness sample is necessary to be designed to reduce in term of 80 μm. The film thickness is reduced by (water permeability in terms of 80 μm=measured water permeability×measured film thickness/80 μm).

For the measuring method, the method described in "The physical property of polymer II" (polymer experiment study 4, published by Kyoritsu Publication) page 285 to 294: measurement of vapor permeability (mass method, thermo-hygrometer, vapor pressure method and absorption amount method) can be applied. The humidity of 70 mmφ cellulose acylate film sample of present invention is controlled under the condition of 25° C., and 90% RH and 60° C., and 5% RH for 24 hours, and the sample is subjected to a moisture permeability tester (KK-709007, manufactured by Toyo Seiki Seisakusho, Ltd.) to calculate a moisture content per unit area (g/m$^2$), according to JIS Z-0208 by using the following equation.

Moisture permeability=mass after moisture conditioning−mass before moisture conditioning (Dimensional Change of Film)

Regarding the dimensional stability of the cellulose acylate film of the invention, the rate of dimensional change under high humidity, as measured after keeping the sample under the condition of 60° C., and 90% RH for 24 hours, and the rate of dimensional change under high temperature, as measured after keeping the sample under the condition of 90° C., and 5% RH for 24 hours are preferably 0.5% or less, more preferably 0.3% or less and more preferably 0.15% or less.

Specific measuring method is as follows. Two samples of the cellulose acylate film are prepared in a size of 30 mm×120 mm, and the humidity of the sample is conditioned at 25° C., and 60% RH for 24 hours. The 6 mmφ hole is opened at each of the ends of the sample at an interval of 100 mm by automatic pin gauge (manufactured by Shinto Scientific Co., Ltd.), and distance between these punched holes are measured (L0). The distance (L1) between the punched holes after treatment under the condition of 60° C., and 90% RH for 24 hours, and the distance (L2) between the punched holes after treatment under the condition of 90° C., and 5% RH for 24 hours are measured. The measuring is performed to the minimum scale of the order of 1/1000 mm. The rate of dimensional change is calculated according to the following equation.

Rate of dimensional change at 60° C., and 90% RH(high humidity)={|L0−L1|/L0}×100, Rate of dimensional change 90° C., and 5% RH (high temperature)={|L0−L2|/L0}×100

(Elastic Modulus of Film)

The elastic modulus of the cellulose acylate film is preferably 200 to 500 kgf/mm$^2$, more preferably 240 to 470 kgf/mm$^2$, and more preferably 270 to 440 kgf/mm$^2$. Specifically, the samples are stretched by 0.5% tensile strength under the condition of 23° C. and 70% and stretching rate of 10%/min. The stress is measured using universal tensile tester (STM T50BP, manufactured by Toyo Baldwin Co., Ltd.) to determine the elastic modulus.

(Coefficient of Optical Elasticity of Film)

The coefficient of optical elasticity of a cellulose acylate according to the present invention is preferably 50×10$^{-13}$ cm$^2$/dyne or less, more preferably 30×10$^{-13}$ cm$^2$/dyne or less, and most preferably 20×10$^{-13}$ cm$^2$/dyne. As a specific measuring method, a cellulose acylate film sample of 12 mm×12 mm was applied with tensile stress in a longitudinal direction, and the retardation at that time was measured by ellipsometer (M150, JASCO Corporation), and then the coefficient of optical elasticity was calculated from the variation of the retardation with respect to the stress.

(Change of Front Retardation Before and After Stretching and Detection of Slow Axis)

A sample of 100×100 mm was prepared, and stretching was carried out using a fixed uniaxial drawing machine under the condition at the temperature of 140° C. in the machine direction (MD direction) or the transverse direction (TD direction). The front retardation of each sample before and after the stretching was measured using an automatic birefringence meter KOBRA21ADH. Detection of the slow axis was determined from orientation angle which is obtained when measuring the above-mentioned retardation. Smaller change of Re by stretching is preferred, and specifically, when Re$_{(n)}$ represents the front in-plane retardation (nm) of n(%) stretched film, and Re$_{(o)}$ represents the front in-plane retardation (nm) of non-stretched film, it is preferable that |Re$_{(\lambda)}$−Re$_{(o)}$|/n≦1.0, and more preferable that |Re$_{(\lambda)}$−Re$_{(o)}$|/n≦0.3 or less.

(Direction of Having Slow Axis)

Since the polarizing film has the absorption axis in the machine direction (MD direction), the cellulose acylate film that can be used in the present invention has the slow axis preferably close to the MD or TD direction. Having the slow axis in parallel or perpendicular to the polarizing film, light leakage and change in color can be reduced. The term "close" refers to, for example, an angle between the slow axis and MD direction or the slow axis and TD direction in the range of 0 to 10°, and preferably in the range of 0 to 5°.

(Cellulose Acylate Film whose Intrinsic Birefringence is Positive)

When the cellulose acylate film that can be used in the invention is stretched in the direction having the slow axis in the film plane, the front retardation is increased, and when the cellulose acylate film is stretched in the direction perpendicular to the direction having the slow axis in the film plane, the front retardation is decreased. This shows that the intrinsic birefringence is positive, and that stretching in the direction perpendicular to the slow axis is effective in removing retardation exhibited within the cellulose acylate film. For this method, it is considered, for example, to decrease the front retardation using tenter stretching in the direction perpendicular to MD (TD direction) when the film has the slow axis in the machine direction (MD direction). As an inverse example, it is considered to decrease the front retardation by stretching strongly the tension of the machine conveyance roll in MD direction when it has the slow axis in TD direction.

(Cellulose Acylate Film whose Intrinsic Birefringence is Negative)

It is also possible that when the cellulose acylate film that can be used in the invention is stretched in the direction having the slow axis, the front retardation decreases, and when it is stretched in the direction which is perpendicular to the direction having the slow axis, the front retardation increases. This shows that the intrinsic birefringence is negative, and stretching in the same direction as that of the slow axis is effective in removing retardation exhibited within the cellulose acylate film. For this method, it is considered, for example, to decrease the front retardation by stretching strongly the tension of the machine conveyance roll in MD direction when the cellulose acylate film has the slow axis in MD direction. As an inverse example, it is considered to decrease the front retardation using tenter stretching in the direction which is perpendicular to MD (TD direction) when it has the slow axis in TD direction.

[Method for Evaluation of Cellulose Acylate Film]

For evaluation of the cellulose acylate film that can be used in the present invention, the measurement was carried out in the following methods in Examples of the invention which are described below.

(In-Plane Retardation Re and Retardation Along Thickness Direction Rth)

A sample of 30 mm×40 mm was conditioned in humidity at 25° C. and 60% RH for 2 hours, and $Re_{(\lambda)}$ was measured by entering the light of λ nm wavelength in the direction from the normal of the film with an automatic birefringence meter KOBRA21ADH (manufactured by Oji Scientific Instruments Co., Ltd.). In addition, $Rth_{(\lambda)}$ was calculated by inputting the assumed value 1.48 of the average refraction index and the film thickness to the base having the above-mentioned $Re_{(\lambda)}$ and the retardation value measured by entering the light of λ nm wavelength such that the in-plane slow axis is considered as an oblique axis and the direction from normal of the film is considered as 0°, where the sample is tilted every 10° until 50°.

(Measurement of Chromatic Dispersion of Re and Rth)

A sample of 30 mm×40 mm was conditioned in humidity at 25° C. and 60% RH for 2 hours, and chromatic dispersion of Re was measured by determining Re at each wavelength by entering the light of from 780 nm to 380 nm wavelength in the direction from normal of the film with Ellipsometer M-150 (manufactured by JASCO Corporation). In addition, for the chromatic dispersion of Re, it was calculated on the base of retardation values which were measured in the total of three directions, i.e., the above-mentioned Re, the retardation value which was measured by entering the light of 780 to 380 nm from the direction which is tilted by +40° to the direction from normal of the film for the oblique axis which is the in-plane slow axis, and the retardation value which was measured by entering the light of 780 nm to 380 nm wavelength from the direction which is tilted by −40° to the direction from normal of the film for the oblique axis which is the in-plane slow axis, and by inputting the assumed value 1.48 of the average refraction index and the film thickness.

(Molecular Orientation Axis)

Humidity of sample of 70 mm×100 mm was conditioned at 25° C., 60% RH for 2 hours, and the molecular orientation axis was calculated form the phase difference at the time that an incident angle in a vertical incidence has changed by an automatic birefringence meter (KOBRA21DH, Oji Scientific Instruments Co., Ltd.).

(Axis Shift)

Furthermore, an axis shift angle was measured using automatic birefringence meter. Twenty points at equal intervals are measured over the whole width in a transverse direction and an average value of absolute values was obtained. A range of phase retardation axis angle (axis shift) is that twenty points at equal intervals are measured over the whole width in a transverse direction and the difference between average of four points from the large absolute value of the axis shift and average of four points from the small absolute value of the axis shift.

(Transmittance)

The transmittance of visible light (615 nm) of sample of 20 mm×70 mm was measured at 25° C., 60% RH using a transparency measuring instrument (AKA photoelectric tube colorimeter, KOTAKI Ltd.).

(Spectroscopic Characterization)

The transmittance at wavelength of 300 to 450 nm of sample of 13 mm×40 mm was measured at 25° C., 60% RH using a spectrophotometer (U-3210, HITACHI LTD.). The inclination width was obtained at a wavelength of 75% a wavelength of 5%. A limit wavelength was appeared at a wavelength of (inclination angle/2)+5%. An absorption edge was appeared at a wavelength having transmittance of 0.4%. From this, the transmittance at 380 nm and 350 nm was evaluated.

(Surface Property of Cellulose Acylate Film)

It is preferred that a surface of cellulose acylate film of the present invention has an arithmetic average roughness (Ra) of the surface unevenness of the film of 0.1 μm or less, and a maximum height (Ry) of 0.5 μm or less based on JISBO601-1994. More preferably, the arithmetic average roughness (Ra) is 0.05 μm or less and the maximum height (Ry) is 0.2 μm or less. Unevenness of the film surface can be evaluated using an atomic force microscope (AFM).

(Irregularity in Plane of Retardation of Cellulose Acylate Film)

It is preferred that the cellulose acylate film of the present invention satisfies following equation.

$|Re(MAX)-Re(MIN)| \leq 3$ and $|Rth(MAX)-Rth(MIN)| \leq 5$ (wherein, Re(MAX), Rth(MAX) are maximum retardation values of a film of 1 m square cut off optionally, and Re(MIN), Rth(MIN) are minimum values thereof, respectively).

(Retention Property of Film)

For the cellulose acylate film of the present invention, retention property is required for various compounds which are added to the film. Specifically, the mass change of the film is preferably 0 to 5% when the cellulose acylate film of the present invention is left under the condition of 80° C./90% RH for 48 hours. It is more preferably 0 to 3%, and more preferably 0 to 2%.

(Evaluation Method for the Retention Property)

The sample was cut into a size of 10 cm×10 cm, and left under atmosphere of 23° C. and 55% RH for 24 hours and then the mass was measured. Then, it was left under the condition of 80±5° C. and 90±10% RH for 48 hours. The surface of the sample after the treatment was lightly wiped, and left at 23° C. and 55% RH for one day, and then the mass was measured. The retention property was calculated by the following method.

Retention property (mass %)={(the mass before being left−the mass after being left)/the mass before being left}×100

(Mechanical Properties of Film)

(Curl)

The curl value of the cellulose acylate film of the present invention in the horizontal direction is preferably −10/m to +10/m. When carrying out the surface treatment, conduction of the rubbing treatment in applying and building optical anisotropic layers, or carrying out application and building or lamination of an alignment film or optical anisotropic layer and the like for a long time for the cellulose acylate film of the present invention as described below, if the curl value of the cellulose acylate film of the present invention in the horizontal direction is beyond the above-mentioned range, it may cause problems in handling the film or cause cutting of the film. In addition, since the film contacts strongly with the convey roll at the edge or central part and the like of the film, the dust is easy to occur, adhesion of foreign substances onto the film increases, and point defect of the optical compensation film or frequency of application line may be beyond the acceptable value. In addition, with the curl in the above-mentioned range, it is possible to reduce spot trouble which is easy to occur when installing the optical anisotropic layer, and also prevent air bubbles from entering in polarization film lamination, so it is preferred.

The curl value can be measured according to the measurement method set forth by American National Standards Institute (ANSI/ASCPH1.29-1985).

(Tear Strength)

The tear strength based on the tear test method of JISK 7128-2: 1998 (Elmendorf tear method) is preferably 2 g or more for the cellulose acylate film of the present invention in the thickness range of 20 to 80 μm. It is more preferably 5 to 25 g, and more preferably 6 to 25 g. In addition, it is preferably 8 g or more when converted to 60 μm, more preferably 8 to 15 g. Specifically, 50 mm×64 mm of the sample segment is regulated in humidity under the condition of 25° C. and 65% RH for 2 hours, and then it can be measured using a tear strength tester of light load.

(The Amount of the Remaining Solvent of Film)

The cellulose acylate film of the present invention is preferably dried at the condition to make that the amount of the remaining solvent is in the range of 0.01 to 1.5 mass %. It is more preferably 0.01 to 1.0 mass %. It is possible to suppress the curl by regulating the amount of the remaining solvent in the transparent supporter which is used in the present invention to 1.5% or less. It is more preferably 1.0% or less. It is considered that the main factor of the effects is that free accumulation is reduced by reducing the amount of the remaining solvent in filming by the above-mentioned solvent cast method.

(Hygroscopic Expansion Coefficient of Film)

The hygroscopic expansion coefficient of the cellulose acylate film of the present invention is preferably $30 \times 10^{-5}$% RH or less. The hygroscopic expansion coefficient is more preferably $15 \times 10^{-5}$% RH or less, and more preferably $10 \times 10^{-5}$% RH or less. In addition, the hygroscopic expansion coefficient is preferable as it is small, but usually, it is a value of $1.0 \times 10^{-5}$% RH or more. The hygroscopic expansion coefficient refers to the amount of the change of the sample length when the relative humidity changes at certain temperature. By regulating the hygroscopic expansion coefficient, it is possible to prevent increase in frame-shaped transmission, i.e., light leakage by distortion while maintaining optical compensation functions of the optical compensation film in using the cellulose acylate film of the present invention as an optical compensation film supporter.

(The Surface Treatment)

By carrying out the surface treatment depending on the situation, it is possible to achieve improvement of adhesion of the cellulose acylate film to each of the function layers (for example, the primer layer and the back layer). For example, it is possible to use glow discharge treatment, ultraviolet light irradiation treatment, corona treatment, flame treatment, acid or alkali treatment. The glow discharge treatment herein may be low temperature plasma which occurs under low pressure gas of $10^{-3}$ to 20 Torr, and further it is also preferably plasma treatment under atmospheric pressure. Plasma excited gas refers to the gas which is plasma-excited under the above-mentioned conditions, and for example, it is argon, helium, neon, krypton, xenon, nitrogen, carbon dioxide and chlorofluorocarbon such as tetrafluoromethane and a mixture thereof and the like. Regarding this, details are described particularly in pp. 30-32 in the journal of technical disclosure by Japan Institute of Invention and Innovation (Laid-open technique NO. 2001-1745, published on Mar. 15, 2001, Japan Institute of Invention and Innovation), which can be preferably used in the present invention.

(Contact Angle of the Film Surface by Alkali Saponification Treatment)

Alkali saponification treatment can be taken as one of effective means of the surface treatment when using the cellulose acylate film of the present invention as a transparent protective film of a polarization plate. In this case, the contact angle of the film surface after alkali saponification treatment is preferably 55° or less. It is more preferably 50° or less, and more preferably 45° or less. As an evaluation method for the contact angle, it can be used evaluation of hydrophilic/hydrophobic property by a conventional method wherein the water droplet of 3 mm diameter is dropped on the film surface after the alkali saponification treatment, and the angle of the film surface with the water droplet is found.

(Light Resistance)

As an index of light endurance of the cellulose acylate of the present invention, color difference $\Delta E^*ab$ of the film which has been irradiated by super xenon light for 240 hours is preferably 20 or less. It is more preferably 18 or less, and more preferably 15 or less. Measurement for the color difference was by UV3100 (manufactured by Shimadzu Corporation). For the measurement method, the film was regulated in humidity at 25° C. and 60% RH for 2 hours or more, and then color measurement for the film before xenon light irradiation was carried out to find the initial value (L0*, a0*, b0*). Then, a film was irradiated with the xenon light for 240 hours under the condition of 150 W/m², 60° C. and 50% RH at super xenon weather meter SX-75 (manufactured by Suga test instruments, Co., Ltd.). After the predetermined time passed, the film was taken out of the constant temperature bath, and regulated in humidity at 25° C. and 60% RH for 2 hours, and then color measurement was carried out again to obtain the value after a lapse of a predetermined time (L1*, a1*, b1*). From this, color difference ΔE*ab=((L0*−L1*)^2+(a0*−a1*)^2+(b0*−b1*)^2)^0.5 was found.

EXAMPLES

The invention is described in more detail with reference to the following Examples, in which the material used, its amount and ratio, the details of the treatment and the treatment process may be suitably modified or changed not overstepping the spirit and the scope of the invention. Accordingly, the invention should not be limitatively interpreted by the Examples mentioned below.

<Production of IPS Mode Liquid Crystal Cell No. 1>

Electrodes (2 and 3 in FIG. 1) were arranged on a piece of glass substrate that the distance between the adjacent electrodes was 20 μm as shown in FIG. 1, and on top of that, a polyimide film was provided as an orientation film, and rubbing treatment was carried out. The rubbing treatment was carried out in the direction 4 shown in FIG. 1. On one surface of a sheet of glass substrate that was separately prepared, polyimide film was provided, and rubbing treatment was carried out, which was taken as an orientation film. Two sheets of glass substrate were placed with the orientation films being opposite to each other such that the gap (gap: d) between the substrates is 3.9 μm, and they were overlapped and laminated with the rubbing directions of the two sheets of glass substrate having them in parallel, and then a nematic liquid crystal composition was sealed, whose refraction index anisotropy (Δn) is 0.0769 and dielectric constant anisotropy (Δ∈) is +4.5. d·Δn value of the liquid crystal layer is 300 nm.

<Preparation of First Retardation Region No. 1, First Retardation Region No. 2 and First Retardation Region No. 3>

Heat-shrinkable films made of a uniaxially stretched polyester film were adhered on both sides of a polycarbonate film having a thickness of 80 μm and Re of 120 nm, through acrylic-based adhesive layers, in a such manner that slow axes of the heat-shrinkable films were perpendicular to the polycarbonate film. The obtained film was heated to 160° C. and then the heat-shrinkable films were shrunk so that the length in the width direction was made to be 88%, 97% and 93% of a dimension before shrinking, respectively, using a drawing machine. Then, the heat-shrinkable films were separated off to obtain a first retardation region No. 1, a first retardation region No. 2 and a first retardation region No. 3, respectively.

Optical characteristics of the films, determined by measuring a dependence of Re on the light incident angle by an automatic birefringence meter (KOBRA-21ADH, manufactured by Oji Scientific Instruments), confirmed that the first retardation region No. 1 has Re of 150 nm, Rth of −60 nm and Nz of 0.10, the first retardation region No. 2 has Re of 190 nm, Rth of −29 nm and Nz of 0.35, and the first retardation region No. 3 has Re of 160 nm, Rth of −40 nm and Nz of 0.25.

<Preparation of Second Retardation Region No. 1>

The following composition was charged in a mixing tank and agitated under heating to dissolve each component thereby preparing a cellulose acetate solution of the following formulation.

Formulation of cellulose acetate solution:

| | |
|---|---|
| cellulose acetate with acetylation degree of 60.9% | 100 parts by weight |
| triphenyl phosphate (plasticizer) | 7.8 parts by weight |
| biphenyldiphenyl phosphate (plasticizer) | 3.9 parts by weight |
| methylene chloride (first solvent) | 300 parts by weight |
| methanol (second solvent) | 54 parts by weight |
| 1-butanol (third solvent) | 11 parts by weight |

In another mixing tank, 16 parts by weight of the following retardation enhancer, 80 parts by weight of methylene chloride and 20 parts by weight of methanol were charged and agitated under heating to obtain a retardation enhancer solution. Mixing and sufficiently agitating 487 parts by weight of the cellulose acetate solution and 6 parts by weight of the retardation enhancer solution gave a dope.

Retardation Enhancer

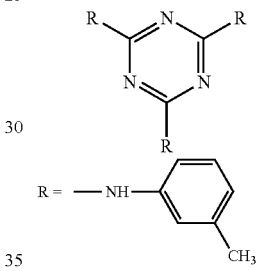

The obtained dope was cast with a band casting machine. A film on a band, upon reaching a film surface temperature of 40° C., was dried for 1 minute with hot air at 60° C. and was peeled off from the band. Then the film was dried for 10 minutes with a drying air of 140° C. to obtain a film having a thickness of 80 μm.

Optical characteristics of the film, determined by measuring a dependence of Re on the light incident angle by an automatic birefringence meter (KOBRA-21ADH, manufactured by Oji Scientific Instruments), provided Re of 5 nm and Rth of 80 nm. The film thus prepared was employed as a second retardation region No. 1.

<Preparation of Protective Film No. 1 for Polarizing Plate>

(Preparation of Cellulose Acetate Solution)

The following composition was charged in a mixing tank and agitated to dissolve each component thereby preparing a cellulose acetate solution A.

(Formulation of Cellulose Acetate Solution A)

| | |
|---|---|
| cellulose acetate with acetylation degree of 2.86 | 100 parts by weight |
| methylene chloride (first solvent) | 402 parts by weight |
| methanol (second solvent) | 60 parts by weight |

(Preparation of Solution of Matting Agent)

20 parts by weight of silicon dioxide particles having an average particle size of 16 nm (AEROSIL R972, manufactured by Degussa) and 80 parts by weight of methanol were stirred and mixed well for 30 minutes to obtain a dispersion of the silicon dioxide particles. This dispersion was charged in a disperser together with the following composition, and further stirred for 30 minutes or more to dissolve each component thereby preparing a solution of a matting agent.

(Formulation of Solution of Matting Agent)

| | |
|---|---|
| dispersion of silicon dioxide particles having an average particle size of 16 nm | 10.0 parts by weight |
| methylene chloride (first solvent) | 76.3 parts by weight |
| methanol (second solvent) | 3.4 parts by weight |
| cellulose acetate solution A | 10.3 parts by weight |

(Preparation of Solution of Additives)

The following composition was charged in a mixing tank and agitated under heating to dissolve each component thereby preparing a cellulose acetate solution.

(Formulation of Solution of Additives)

| | |
|---|---|
| compound for reducing Rth (A-19) | 49.3 parts by weight |
| wavelength dispersion regulating agent (UV-102) | 7.6 parts by weight |
| methylene chloride (first solvent) | 58.4 parts by weight |
| methanol (second solvent) | 8.7 parts by weight |
| cellulose acetate solution A | 12.8 parts by weight |

Furthermore, Log P values of A-19 and UV-102 are 2.9 and 5.6, respectively.

(Preparation of Cellulose Acetate Film)

94.6 parts by weight of the above-mentioned cellulose acetate solution A, 1.3 parts by weight of the solution of a matting agent and 4.1 parts by weight of the solution of additives were respectively filtered and mixed, and were cast with a band casting machine. The weight ratios of the compound for reducing Rth and the wavelength dispersion regulating agent to cellulose acetate in the above-mentioned formulation were 12% and 1.8%, respectively. The film was peeled off from the band when the amount of the remaining solvent is 30%, and dried at 140° C. for 40 minutes to give a cellulose acetate film. The obtained cellulose acetate film had the amount of the remaining solvent of 0.2% and a film thickness of 40 μm.

In addition, this film had $Re_{(630)}$ of 0.3 nm, $Rth_{(630)}$ of 3.2 nm, $|Re_{(400)}-Re_{(700)}|$ of 1.2 nm and $|Rth_{(400)}-Rth_{(700)}|$ of 7.5 nm. The film had Tg of 134.3° C., a haze of 0.34%, and ΔRth (10% RH-80% RH) of 24.9 nm. This film was employed as the protective film No. 1.

<Preparation of Polarizing Plate A>

A polarizing film was then prepared by adsorbing iodine on a stretched polyvinyl alcohol film. A commercially available cellulose acetate film (Fujitac TD80UF, manufactured by Fuji Photo Film Co., Ltd., Re=2 nm and Rth=48 nm) was subjected to a saponification process and was adhered, with a polyvinyl alcohol-based adhesive, to a side of the polarizing film. Then the protective film No. 1 for polarizing plate was adhered, with a polyvinyl alcohol-based adhesive, to an opposite side of the polarizing film, in such a manner that the cellulose acetate film side is at the polarizing film side, to prepare the polarizing plate A.

<Preparation of Polarizing Plate B>

A polarizing film was prepared in the same manner as described above. A commercially available cellulose acetate film (Fujitac TD80UF, manufactured by Fuji Photo Film Co., Ltd.) was subjected to a saponification process and was adhered, with a polyvinyl alcohol-based adhesive, to both sides of the polarizing film to prepare the polarizing plate B. In addition, this commercially available cellulose acetate film had $Re_{(630)}$ of 4.5 nm, $Rth_{(630)}$ of 47.5 nm, $|Re_{(400)}-Re_{(700)}|$ of 9.4 nm and $|Rth_{(400)}-Rth_{(700)}|$ of 22.6 nm.

Example 1

The prepared first retardation region No. 1 was adhered, with an acrylic-based adhesive, to the side of the protective film No. 1 for polarizing plate of the polarizing plate A in such a manner that a transmission axis of the polarizing film was perpendicular to the slow axis of the first retardation region No. 1. Further, the second retardation region No. 1 was adhered thereto with an acrylic-based adhesive.

The polarizing plate was then adhered on a side of the IPS mode liquid crystal cell No. 1 prepared above, in such a manner that the transmission axis of the polarizing plate was parallel to the rubbing direction of the liquid crystal cell (namely, the slow axis of the first retardation region No. 2 becomes perpendicular to the slow axis of the liquid crystal molecules of the liquid crystal cell in a black state) and that the surface side of the second retardation region No. 1 was at the side of the liquid crystal cell.

Subsequently, on the other side of the IPS mode liquid crystal cell No. 1, the polarizing plate A was adhered in such a manner that the side of the protective film No. 1 for polarizing plate was at the side of the liquid crystal cell and that the polarizing plate A was positioned in a crossed Nicol arrangement with the polarizing plate B to obtain a liquid crystal display. Light leakage in the thus prepared liquid crystal display was measured. The measurement is conducted in a dark room, and on Schaukasten therein was first placed the liquid crystal cell No. 1 in a state that a polarizing plate is not adhered. The luminance meter is positioned at 45° orientation in the left direction on the basis of the rubbing direction of the liquid crystal cell and at a distance of 1 m from the liquid crystal cell in the direction of 60° from a direction normal to the liquid crystal cell, to measure the luminance 1.

Then, the liquid crystal display panel of Example 1 was arranged in the same manner on the same Schaukasten, the luminance 2 was measured in the same manner in a black state, and the luminance 2 was expressed in a percentage of the luminance 1 to take as light leakage. The measured light leakage was 0.08%.

Example 2

The prepared first retardation region No. 2 was adhered, with an acrylic-based adhesive, on the polarizing plate B in such a manner that a transmission axis of the polarizing film was parallel to the slow axis of the first retardation region No. 2. In this constitution, Fujitac TD80UF, Re=2 nm and Rth=48 nm, which is the protective membrane of the polarizing plate B, corresponds to secondary retardation region.

The polarizing plate was then adhered on a side of the IPS mode liquid crystal cell No. 1 as prepared above, in such a manner that the transmission axis of the polarizing plate was parallel to the rubbing direction of the liquid crystal cell (namely, the slow axis of the first retardation region No. 1 becomes parallel to the slow axis of the liquid crystal molecules of the liquid crystal cell in a black state) and that the surface side of the first retardation region No. 1 is at the side of the liquid crystal cell.

Subsequently, the polarizing plate A was adhered on the other side of the IPS mode liquid crystal cell No. 1, in such a manner that the side of the protective film No. 1 for the polarizing plate is at the side of the liquid crystal cell and that the polarizing plate A is positioned in a crossed Nicol arrangement with the polarizing plate A to obtain a liquid crystal display. Light leakage in the thus prepared liquid crystal display was 0.03%.

Example 3

The prepared first retardation region No. 3 was adhered, with an acrylic-based adhesive, on the polarizing plate B in such a manner that a transmission axis of the polarizing film was parallel to the slow axis of the first retardation region No. 3. In this constitution, Fujitac TD80UF, Re=2 nm and Rth=48 nm, which is the protective membrane of the polarizing plate B, corresponds to secondary retardation region.

The polarizing plate was then adhered on a side of the IPS mode liquid crystal cell No. 1 as prepared above, in such a manner that the transmission axis of the polarizing plate was parallel to the rubbing direction of the liquid crystal cell (namely, the slow axis of the first retardation region No. 1 becomes parallel to the slow axis of the liquid crystal molecules of the liquid crystal cell in a black state) and that the surface side of the first retardation region No. 1 is at the side of the liquid crystal cell.

Subsequently, the polarizing plate A was adhered on the other side of the IPS mode liquid crystal cell No. 1, in such a manner that the side of the protective film No. 1 for the polarizing plate is at the side of the liquid crystal cell and that the polarizing plate A is positioned in a crossed Nicol arrangement with the polarizing plate A to obtain a liquid crystal display. Light leakage in the thus prepared liquid crystal display was 0.04%.

Example 4

The prepared first retardation region No. 3 was adhered, with an acrylic-based adhesive, on the polarizing plate B in such a manner that a transmission axis of the polarizing film was parallel to the slow axis of the first retardation region No. 3. In this constitution, Fujitac TD80UF, Re=2 nm and Rth=48 nm, which is the protective membrane of the polarizing plate B, corresponds to secondary retardation region.

The polarizing plate was then adhered on a side of the IPS mode liquid crystal cell No. 1 as prepared above, in such a manner that the transmission axis of the polarizing plate was parallel to the rubbing direction of the liquid crystal cell (namely, the slow axis of the first retardation region No. 2 becomes parallel to the slow axis of the liquid crystal molecules of the liquid crystal cell in a black state) and that the surface side of the first retardation region No. 1 is at the side of the liquid crystal cell.

Subsequently, the polarizing plate B wherein the Rth of the protective film is 48 nm, was adhered on the other side of the IPS mode liquid crystal cell No. 1, in such a manner that the side of the protective film No. 1 for the polarizing plate is at the side of the liquid crystal cell and that the polarizing plate B is positioned in a crossed Nicol arrangement with the polarizing plate B to obtain a liquid crystal display. Light leakage in the thus prepared liquid crystal display was 0.19%.

Specifically, it was found that lower was the light leakage in Example 3, which used the polarizing plate B wherein the Rth of the protective film arranged on the side of the liquid crystal cell is 25 nm or less (Rth of the protective film on the side of the liquid crystal cell is 2 nm), than that in Example 4, which used the polarizing plate B wherein the Rth of the protective film arranged on the side of the liquid crystal cell is more than 25 nm (Rth of the protective film on the side of the liquid crystal cell is 48 nm).

Comparative Example 1

A commercially available polarizing plate (HLC2-5618, manufactured by Sanritz Corporation) was adhered on the both sides of the IPS mode liquid crystal cell No. 1 as prepared above in a crossed Nicol arrangement, to prepare a liquid crystal display. An optical compensation film was not used. The protective film of this commercially available polarizing plate was peeled off in a bath, and optical properties were measured. As results, $Re_{(630)}$ was 4.7 nm, $Rth_{(630)}$ was 48.5 nm, $|Re_{(400)}-Re_{(700)}|$ was 10.1 nm and $|Rth_{(400)}-Rth_{(700)}|$ was 23.4 nm.

For the above-mentioned liquid crystal display, the polarizing plate was adhered in the same manner as in Example 1 so that the transmission axis of the upper polarizing plate is parallel to the rubbing direction of the liquid crystal cell. Light leakage in the thus prepared liquid crystal display was 0.55%.

Comparative Example 2

The prepared first retardation region No. 1 was adhered, with an acrylic-based adhesive, on the polarizing plate A in such a manner that a transmission axis of the polarizing film was parallel to the slow axis of the first retardation region No. 1. Further, the second retardation region No. 1 was adhered thereto with an acrylic-based adhesive.

The polarizing plate was then adhered on a side of the IPS mode liquid crystal cell No. 1 as prepared above, in such a manner that the transmission axis of the polarizing plate was perpendicular to the rubbing direction of the liquid crystal cell (namely, the slow axis of the first retardation region No. 2 becomes parallel to the slow axis of the liquid crystal molecules of the liquid crystal cell in a black state) and that the surface side of the second retardation region No. 1 is at the side of the liquid crystal cell.

Subsequently, the polarizing plate A was adhered on the other side of the IPS mode liquid crystal cell No. 1, in such a manner that the side of the protective film No. 1 for the polarizing plate is at the side of the liquid crystal cell and that the polarizing plate B is positioned in a crossed Nicol arrangement with the polarizing plate B to obtain a liquid crystal display. Light leakage in the thus prepared liquid crystal display was 0.99%.

The invention claimed is:

1. A liquid crystal display comprising at least a first polarization film, a first retardation region, a second retardation region, a liquid crystal layer, a liquid crystal cell composed of a pair of substrates with the liquid crystal layer being interposed between the substrates, and a second polarization film disposed in this order, liquid crystal molecules of the liquid crystal layer being aligned in parallel with surfaces of the substrates at the time of dark state, wherein an in-plane retardation (Re) of the first retardation region is 70 nm to 330 nm, an Nz value of the first retardation region defined as Nz=Rth/Re+0.5 using the in-plane retardation (Re) and retardation (Rth) of a thickness direction of the first retardation region is greater than 0 and less than 0.4, an in-plane retardation of the second retardation region is equal to 50 nm or less and an optical axis is simultaneously not included in the in-plane of the second retardation region, a retardation of a thickness direction of the second retardation region is 10 nm to 140 nm, a slow axis of the first retardation region is orthogonal to a transmissive axis of the first polarization film and the transmissive axis of the first polarization film is simultaneously in parallel with a slow axis direction of the liquid crystal molecules at the time of dark state, each of the first and second polarization films has at least a protective film on a plane close to the liquid crystal layer, in which the corresponding protective film may act as another layer, and the corresponding protective film is a cellulose acylate film which meets the formulae (I) and (II) below:

$$0 \leq Re_{(630)} \leq 10, \text{ and, } |Rth_{(630)}| \leq 25 \tag{I}$$

$$|Re_{(400)}-Re_{(700)}| \leq 10, \text{ and, } |Rth_{(400)}-Rth_{(700)}| \leq 35 \tag{II}$$

wherein $Re_{(\lambda)}$ represents an in-plane retardation (nm) in the wavelength λnm, and $Rth_{(\lambda)}$ represents a retardation (nm) of a film thickness direction in the wavelength λnm.

2. The liquid crystal display according to claim 1 wherein the cellulose acylate film includes at least one kind of compounds decreasing the Rth of the corresponding cellulose acylate film in a range meeting the formulae denoted below:

$$(Rth_{(A)}-Rth_{(0)})/A \leq -1.0 \tag{III}$$

$$0.01 \leq A \leq 30 \tag{IV}$$

wherein $Rth_{(A)}$ represents the Rth (nm) of the cellulose acylate film containing the compound decreasing the Rth by A%, $Rth_{(0)}$ represents the Rth (nm) of the cellulose acylate film not containing the compound decreasing the Rth(λ), and A represents % by weight of the compound decreasing the Rth(λ) with respect to a material polymer of the cellulose acylate film.

3. The liquid crystal display according to claim 1, wherein the cellulose acylate film includes at least one kind of compounds decreasing the Rth by 0.01 to 30% by weight respect to a solid content of the cellulose acylate having an acyl substitution degree of 2.85 to 3.00.

4. The liquid crystal display according to claim 1, wherein the cellulose acylate film includes at least one kind of compounds decreasing $|Rth_{(400)}-Rth_{(700)}|$ of the cellulose acylate film by 0.01 to 30% by weight respect to a solid content of the corresponding cellulose acylate.

5. The liquid crystal display according to claim 1, wherein a thickness of the cellulose acylate film is 10 to 120 μm.

6. The liquid crystal display according to claim 1, wherein the cellulose acylate film includes at least one kind of compounds decreasing the Rth and simultaneously having an octanol-water partition coefficient (Log P value) of 0 to 7 by 0.01 to 30% by weight with respect to a solid content of the corresponding cellulose acylate.

7. The liquid crystal display according to claim 6, wherein the compound decreasing the Rth and simultaneously having the octanol-water partition coefficient (Log P value) of 0 to 7 is a compound denoted in the following formula (13) and/or (18):

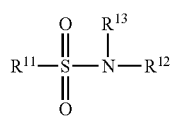

Formula (13)

wherein $R^{11}$ represents an alkyl group or aryl group, each of $R^{12}$ and $R^{13}$ independently represents a hydrogen atom, an alkyl group, or an aryl group,

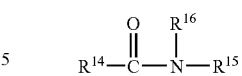

Formula (18)

wherein $R^{14}$ represents an alkyl group or aryl group, each of $R^{15}$ and $R^{16}$ each independently represent a hydrogen atom, an alkyl group, or an aryl group.

8. The liquid crystal display according to claim 1, wherein the cellulose acylate film has a spectral transmissivity of 45 to 95% in the wavelength of 380 nm, and a spectral transmissivity of 10% or less in the wavelength of 350 nm.

9. The liquid crystal display according to claim 1, wherein a variation of the Rth of the cellulose acylate film after processed in RH of 90% at 60° C. for 240 hours is 15 nm or less.

10. The liquid crystal display according to claim 1, wherein a variation of the Rth of the cellulose acylate film after processed at 80° C. for 240 hours is 15 nm or less.

11. The liquid crystal display according to claim 1, wherein an in-plane front retardation of the cellulose acylate film meets the formula denoted below:

$$|Re_{(n)}-Re_{(o)}|/ n \leq 1.0$$

wherein $Re_{(n)}$ represents the in-plane front retardation (nm) of the film stretched by n(%), and $Re_{(o)}$ represents the in-plane front retardation (nm) of the film not stretched.

12. The liquid crystal display according to claim 1, wherein the cellulose acylate film has the slow axis in a direction (TD direction) vertical to a carried direction (MD direction) of the corresponding film of a machine manufacturing the film within the corresponding film in-plane.

13. The liquid crystal display according to claim 1, wherein a front retardation decreases when the cellulose acylate film is stretched in the direction having the slow axis in the corresponding film in-plane, and increases when the cellulose acylate film is stretched in the direction vertical to the direction having the slow axis in the corresponding film in-plane.

14. The liquid crystal display according to claim 1, wherein the first and second retardation regions are disposed in a location closer to the substrate opposite to a visible side in the pair of substrates of the liquid crystal cell.

15. The liquid crystal display according to claim 1, wherein the first and second retardation regions are disposed in a location closer to the substrate at a visible side in the pair of substrates of the liquid crystal cell.

16. A liquid crystal display comprising at least a first polarization film, a second retardation region, a first retardation region, a liquid crystal layer, a liquid crystal cell composed of a pair of substrates with the liquid crystal layer being interposed between the substrates, and a second polarization film disposed in this order, liquid crystal molecules of the liquid crystal layer being aligned in parallel with surfaces of the substrates at the time of dark state, wherein an in-plane retardation (Re) of the first retardation region is 80 nm to 230 nm, an Nz value of the first retardation region defined as Nz=Rth/Re+0.5 using the in-plane retardation (Re) and retardation (Rth) of a thickness direction of the first retardation region is greater than 0 and less than 0.4, an in-plane retardation of the second retardation region is equal to 50 nm or less and an optical axis is simultaneously not included in the in-plane of the second retardation region, a retardation of a thickness direction of the second retardation region is 20 nm to 120 nm, a slow axis of the first retardation region is in parallel with a transmissive axis of the first polarization film and the transmissive axis of the first polarization film is simultaneously in parallel with a slow axis direction of the liquid crystal molecules at the time of dark state, each of the first and second polarization films has at least a protective film on a plane close to the liquid crystal layer, in which the corresponding protective film may act as another layer, and the corresponding protective film is a cellulose acylate film which meets the formulae (I) and (II) below:

$$0 \leq Re_{(630)} \leq 10, \text{ and, } |Rth_{(630)}| \leq 25 \quad \text{(I)}$$

$$|Re_{(400)} - Re_{(700)}| \leq 10, \text{ and, } |Rth_{(400)} - Rth_{(700)}| \leq 35 \quad \text{(II)}$$

wherein $Re_{(\lambda)}$ represents an in-plane retardation (nm) in the wavelength $\lambda$ nm, and $Rth_{(\lambda)}$ represents a retardation (nm) of a film thickness direction in the wavelength $\lambda$ nm.

* * * * *